US008532989B2

(12) United States Patent
Funakoshi et al.

(10) Patent No.: US 8,532,989 B2
(45) Date of Patent: Sep. 10, 2013

(54) COMMAND RECOGNITION DEVICE, COMMAND RECOGNITION METHOD, AND COMMAND RECOGNITION ROBOT

(75) Inventors: Kotaro Funakoshi, Wako (JP); Mikio Nakano, Wako (JP); Xiang Zuo, Sakyo-ku (JP); Naoto Iwahashi, Soraku-gun (JP); Ryo Taguchi, Nagoya (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 12/874,779

(22) Filed: Sep. 2, 2010

(65) Prior Publication Data

US 2011/0112839 A1 May 12, 2011

Related U.S. Application Data

(60) Provisional application No. 61/239,568, filed on Sep. 3, 2009, provisional application No. 61/266,272, filed on Dec. 3, 2009.

(51) Int. Cl.
*G10L 15/06* (2006.01)

(52) U.S. Cl.
USPC ............... 704/240; 704/10; 704/2; 704/215; 704/231; 704/235; 704/249; 704/254; 704/257; 704/275; 706/23; 706/45; 715/716; 348/36

(58) Field of Classification Search
USPC ............ 704/275, 235, 231, 10, 2, 215, 249, 704/254, 257; 348/36; 700/245, 250; 701/25; 706/23, 45; 715/716
See application file for complete search history.

(56) References Cited

U.S. PATENT DOCUMENTS

| 4,820,059 | A | * | 4/1989 | Miller et al. | 704/254 |
|---|---|---|---|---|---|
| 5,357,596 | A | * | 10/1994 | Takebayashi et al. | 704/275 |
| 5,386,499 | A | * | 1/1995 | Tokita | 700/250 |
| 5,675,706 | A | | 10/1997 | Lee et al. | |
| 5,899,972 | A | * | 5/1999 | Miyazawa et al. | 704/249 |
| 6,088,671 | A | * | 7/2000 | Gould et al. | 704/235 |
| 6,931,384 | B1 | * | 8/2005 | Horvitz et al. | 706/45 |
| 8,321,221 | B2 | * | 11/2012 | Aoyama et al. | 704/257 |
| 8,374,721 | B2 | * | 2/2013 | Halloran et al. | 700/245 |
| 2002/0188454 | A1 | * | 12/2002 | Sauber | 704/275 |
| 2004/0054531 | A1 | * | 3/2004 | Asano | 704/231 |
| 2004/0204942 | A1 | * | 10/2004 | Lee | 704/254 |
| 2004/0243416 | A1 | * | 12/2004 | Gardos | 704/275 |
| 2005/0080619 | A1 | * | 4/2005 | Choi et al. | 704/215 |

(Continued)

OTHER PUBLICATIONS

Asoh, Hideki et al., "A Spoken Dialog System for a Mobile Office Robot," Proc. on Eurospeech, pp. 1139-1142 (1999).

(Continued)

*Primary Examiner* — Michael Colucci
(74) *Attorney, Agent, or Firm* — Nelson Mullins Riley & Scarborough LLP; Anthony A. Laurentano

(57) ABSTRACT

A command recognition device includes: an utterance understanding unit that determines or selects word sequence information from speech information; speech confidence degree calculating unit that calculates degree of speech confidence based on the speech information and the word sequence information; a phrase confidence degree calculating unit that calculates a degree of phrase confidence based on image information and phrase information included in the word sequence information; and a motion control instructing unit that determines whether a command of the word sequence information should be executed based on the degree of speech confidence and the degree of phrase confidence.

7 Claims, 9 Drawing Sheets

(56) References Cited

U.S. PATENT DOCUMENTS

| | | | |
|---|---|---|---|
| 2005/0193343 A1* | 9/2005 | Kawabe et al. | 715/716 |
| 2007/0239641 A1* | 10/2007 | Ito et al. | 706/23 |
| 2007/0250212 A1* | 10/2007 | Halloran et al. | 700/245 |
| 2008/0133228 A1* | 6/2008 | Rao | 704/231 |
| 2008/0154576 A1* | 6/2008 | Wu et al. | 704/2 |
| 2008/0228496 A1* | 9/2008 | Yu et al. | 704/275 |
| 2009/0003653 A1* | 1/2009 | Takahata et al. | 382/103 |
| 2009/0265163 A1* | 10/2009 | Li et al. | 704/10 |
| 2009/0326936 A1* | 12/2009 | Nagashima | 704/235 |
| 2010/0002071 A1* | 1/2010 | Ahiska | 348/36 |
| 2010/0106356 A1* | 4/2010 | Trepagnier et al. | 701/25 |

OTHER PUBLICATIONS

Fujie, Shinya et al., "Conversation Robot with the Function of Gaze Recognition," Proc. of the IEEE-RAS International Conference on Humanoid Robots, pp. 364-369 (2006).

Fujimoto, Masakiyo et al., "Sequential Non-stationary Noise Tracking Using Particle Filtering with Switching Dynamical System," Proc. on ICASSP, vol. 2:769-772 (2006).

Itoh, Toshihiko et al., "Linguistic and Acoustic Changes of User's Utterances Caused by Different Dialogue Situations," Proc. ICSLP, pp. 545-548 (2002).

Iwahashi, Naoto, "Robots That Learn Language: A Developmental Approach to Situated Human-Robot Conversations," Human-Robot Interactions, Nilanjan Sarkar (Ed.), Itech Education and Publishing, Vienna, Austria, Chpt. 5, pp. 95-118 (2007).

Jiang, Hui, "Confidence measures for speech recognition: A survey," Speech Communication, vol. 45:455-470 (2005).

Kurita, Takio, "Iterative Weighted Least Squares Algorithms for Neural Networks Classifiers," Proceedings of the Third Workshop on Algorithmic Learning Theory (1992).

Lane, Ian R. et al., "Out-of-Domain Utterance Detection using Classification Confidences of Multiple Topics," IEEE Trans. Audio, Speech, and Language Proceedings, vol. 15(1):150-161 (2007).

Lang, Sebastian et al., "Providing the Basis for Human-Robot-Interaction: A Multi-Modal Attention System for a Mobile Robot," Proc. of the Int'l Conf. on Multimodal Interfaces, pp. 28-35 (2003).

Maglio, Paul P. et al., "Attentive Agents," Communications of the ACM, vol. 46(3):47-51 (2003).

Nakamura, Satoshi et al., "The ATR Multilingual Speech-to-Speech Translation System," IEEE Transactions on Audio, Speech, and Language Processing, vol. 14(2):365-376 (2006).

San-Segundo, Ruben et al., "Confidence Measures for Spoken Dialogue Systems," Proc. on ICASSP, pp. 393-396 (2001).

Yamada, Shinya et al., "Linguistic and Acoustic Features Depending on Different Situations—The Experiments Considering Speech Recognition Rate," INTERSPEECH, pp. 3393-3396 (2005).

Yamagata, Tomoyuki et al., "System Request Detection in Conversation Based on Acoustic and Speaker Alternation Features," INTERSPEECH, pp. 2789-2792 (2007).

Yamagata, Tomoyuki et al., "System Request Detection in Human Conversation Based on Multi-Resolution Gabor Wavelet Features," INTERSPEECH, pp. 256-259 (2009).

Yonezawa, Tomoko et al., "Evaluating Crossmodal Awareness of Daily-partner Robot to User's Behaviors with Gaze and Utterance Detection," Proc. on CASEMANS, pp. 1-8 (2009).

\* cited by examiner

|  | ATTENTION TO ROBOT | NO ATTENTION TO ROBOT | TOTAL |
|---|---|---|---|
| RD SPEECH | 155 | 10 | 165 |
| OOD SPEECH | 553 | 265 | 818 |
| TOTAL | 678 | 275 | 983 |

# COMMAND RECOGNITION DEVICE, COMMAND RECOGNITION METHOD, AND COMMAND RECOGNITION ROBOT

CROSS-REFERENCE TO RELATED APPLICATIONS

This application is U.S. patent Non-provisional application that claims the benefit of U.S. Patent Provisional Application No. 61/239,568, filed Sep. 3, 2009, and U.S. Patent Provisional Application No. 61/266,272, filed Dec. 3, 2009, the contents of which are incorporated herein by reference.

BACKGROUND OF THE INVENTION

1. Field of the Invention

The present invention relates to a command recognition device, a command recognition method, and a command recognition robot.

2. Description of Related Art

In putting a robot into practical use, it is important to enable a user to easily utilize an interface used to controlling a robot's motion. Recently, an interface that recognizes speech uttered by a user and uses the recognized speech as a command to the robot to control the robot's motion has been developed.

For example, in the inventions described in "Providing the Basis for Human-Robot-Interaction: A Multi-Modal Attention System for a Mobile Robot", written by S. Lang, M. Kleinehagenbrock, S. Hohenner, J. Fritsch, G. A. Fink, and G. Sagerer, published in "Proceedings of the International Conference on Multimodal Interfaces", 2003, pp. 28-35 (Non-patent Document 1) and "Conversation robot with the function of gaze recognition", written by S. Fujie, T. Yamahata, and T. Kobayashi, published in "Proceedings of the IEEE-RAS International Conference on Humanoid Robots", 2006, pp. 364-369 (Non-Patent Document 2), when it is detected that a user's gaze or body orientation is directed to a robot, the speech is considered to be a command to the robot.

However, in the inventions described in Non-patent Documents 1 and 2, when a user's gaze or body orientation is directed to a robot, there is a problem that the user's speech is erroneously recognized as a command, regardless of whether the user's speech is a command to the robot or not. This problem occurs, for example, when a user explains a command to a robot to another person.

SUMMARY OF THE INVENTION

The invention is made in consideration of the above-mentioned problem and provides a command recognition device, a command recognition method, and a command recognition robot, which can precisely recognize a command for controlling a robot's motion by the use of speech when a user intends to control.

To solve the above-mentioned problem, an aspect of the invention provides (1) a command recognition device including: an utterance understanding unit that determines or selects word sequence information from speech information; speech confidence degree calculating unit that calculates a degree of speech confidence based on the speech information and the word sequence information; and a phrase confidence degree calculating unit that calculates a degree of phrase confidence based on image information and phrase information included in the word sequence information, wherein the command recognition device is configured to determine whether a command of the word sequence information is to be executed based on the degree of speech confidence and the degree of phrase confidence.

(2) The command recognition device may further include an image analysis unit that calculates a feature quantity of an object from the image information, and the phrase confidence degree calculating unit may calculate an degree of image confidence representing the confidence that the object having the feature quantity is an object of the phrase information as the degree of phrase confidence.

(3) The command recognition device may further include an image analysis unit that calculates a motion of an object from the image information, and the phrase confidence degree calculating unit may calculate a degree of motion confidence representing the confidence that the motion is a motion of the phrase information as the degree of phrase confidence.

(4) In the command recognition device, the image analysis unit may calculate a motion of an object from the image information, the phrase confidence degree calculating unit may calculate a degree of motion confidence representing the confidence that the motion is a motion of the phrase information as the degree of phrase confidence, and the motion control instructing unit may determine whether the command of the word sequence information should be executed based on the degree of speech confidence, the degree of image confidence, and the degree of motion confidence.

(5) The command recognition device may further include attention determining unit that determines whether a speech uttering person gives attention to a robot based on a captured image and that executes the command of the word sequence information when determining that the speech uttering person gives attention to the robot.

(6) In the command recognition device, the utterance understanding unit may determine command information based on word sequence information of which a command is previously determined as being executed.

According to the above-mentioned configurations, it is possible to provide a command recognition device, a command recognition method, and a command recognition robot, which can precisely recognize a command for controlling a robot's motion by the use of speech only when a user intends to.

DETAILED DESCRIPTION OF THE INVENTION

First Embodiment

Figure 1:
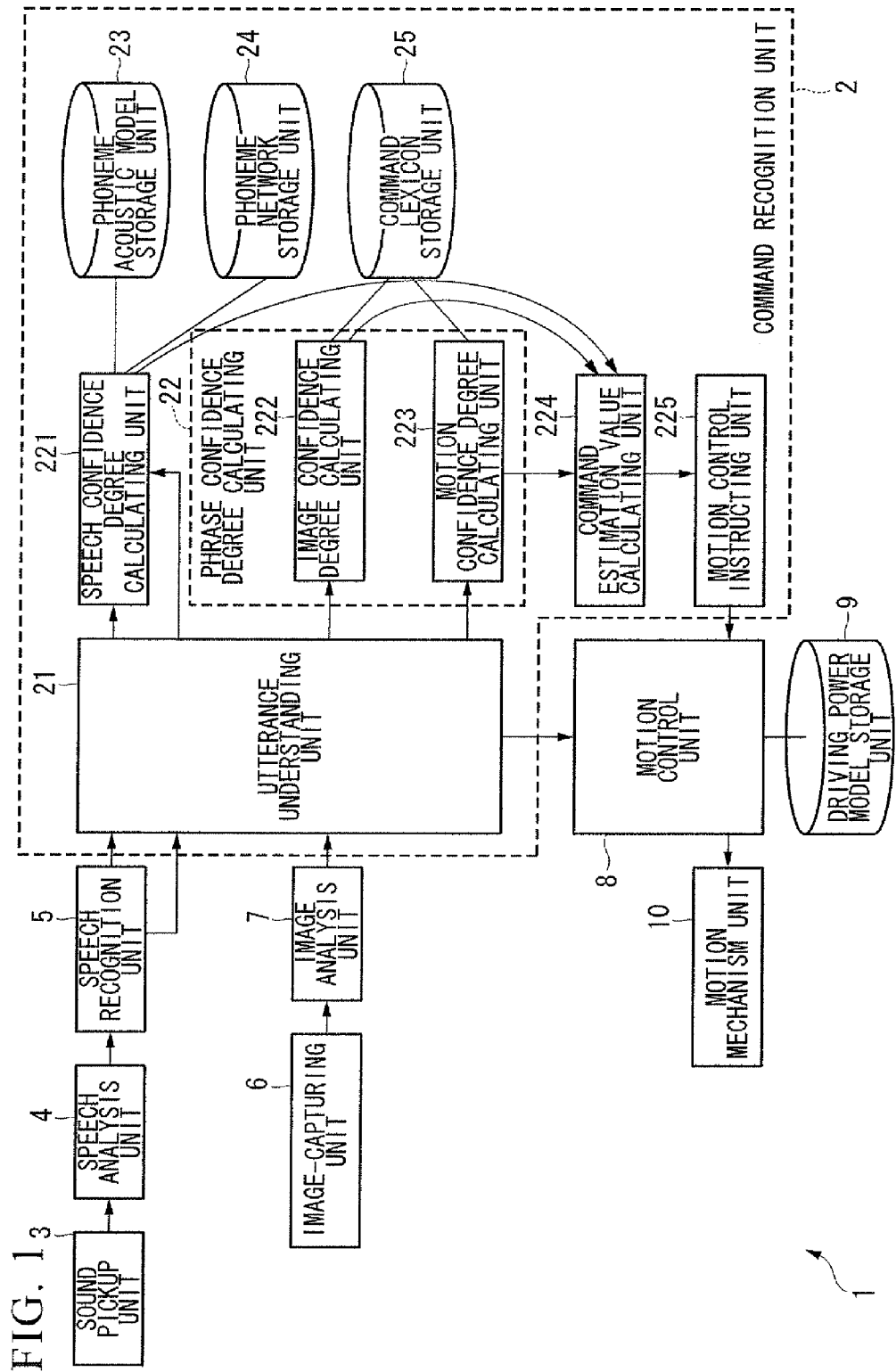
FIG. 1 is a conceptual block diagram illustrating the configuration of a command recognition robot according to a first embodiment of the invention.

Hereinafter, a first embodiment of the invention will be described in detail with reference to the accompanying drawings. FIG. 1 is a block diagram illustrating a command recognition robot 1 according to the first embodiment of the invention. The command recognition robot 1 includes a command recognition unit 2, a sound pickup unit 3, speech analysis unit 4, speech recognition unit 5, an image-capturing 6, an image analysis unit 7, an action control unit 8, a driving power model storage unit 9, and a motion mechanism unit 10. The command recognition unit 2 corresponds to a command recognition device according to an embodiment of the invention.

The command recognition unit 2 includes an utterance understanding unit 21, speech confidence degree calculating unit 221, a phrase confidence degree calculating unit 22, a phoneme acoustic model storage unit 23, a phoneme network storage unit 24, and a command lexicon storage unit 25. The phrase confidence degree calculating unit 22 includes an image confidence degree calculating unit 222 and a motion confidence degree calculating unit 223. The phrase confidence degree calculating unit 22 may include any one of the image confidence degree calculating unit 222 and the motion confidence degree calculating unit 223.

The sound pickup unit 3 receives sound waves transmitted in air due to speech uttered by a user. The sound pickup unit 3 is, for example, a microphone that receives sound waves containing a human speech component. The sound pickup unit 3 converts the received sound waves into speech signal and outputs the speech signal to the speech analysis unit 4.

The speech analysis unit 4 converts the speech signal input from the sound pickup unit 3 into a digital speech signal and performs noise suppression and speech detection for each frame by the use of known methods. For example, a Gaussian mixture model-based (GMM-based) end-point detection method is used in the speech detection, but other methods may be used. The speech analysis unit 4 calculates speech feature quantity from the speech signal of an interval detected as speech and outputs the speech feature quantity to the speech recognition unit 5. The speech feature quantity is a 24-dimension feature vector including a mel-scale cepstrum and a delta cepstrum which is a difference in mel-cepstrum between frames.

The speech recognition unit 5 generates speech information s representing the details uttered by a user by the use of a known speech recognition method based on the speech feature quantity input from the speech analysis unit 4. The speech information s is information representing a word sequence including one or more words. The speech recognition unit 5 outputs the speech information s to the utterance understanding unit 21 and the speech confidence degree calculating unit 221.

The image-capturing 6 photographs a peripheral image and outputs an image signal of the photographed image to the image analysis unit 7. The image analysis unit 7 converts the analog image signal input from the image-capturing 6 into a digital image signal. The image analysis unit 7 determines whether one or more objects o exist based on the resultant digital image signal and calculates an image feature quantity $o_f$ of each object.

Here, the image analysis unit 7 extracts the outline of the object o from the digital image signal. To extract the outline, the image analysis unit 7 performs, for example, the following processes (a) to (d). (a) The image analysis unit 7 smoothes pixel values of a predetermined number of pixels adjacent to each other in a horizontal direction and a vertical direction. (b) The image analysis unit 7 calculates differential values between the pixels adjacent in the horizontal direction and the vertical direction based on the smoothed pixel values. (c) The image analysis unit 7 extracts a part of the calculated differential values greater than a predetermined threshold value. (d) The image analysis unit 7 determines a part forming a closed area out of the parts as an outline of an object. When the image analysis unit 7 cannot extract an outline, the image analysis unit 7 determines that no object exists.

The image feature quantity $o_f$ of an object o is, for example, an information set of size, shape, and color. The size is, for example, an area. The image analysis unit 7 calculates the areas of the objects based on the number of pixels surrounded by the outlines of the objects. The shape is, for example, an aspect ratio and squareness. The image analysis unit 7 determines the aspect ratio, for example, by calculating a height from a difference between the maximum value and the minimum value in the vertical direction of each outline, calculating a width from a difference between the maximum value and the minimum value in the horizontal direction, and dividing the height by the width. The squareness is a scale representing a degree of angulation of the outline shape.

Figure 2:
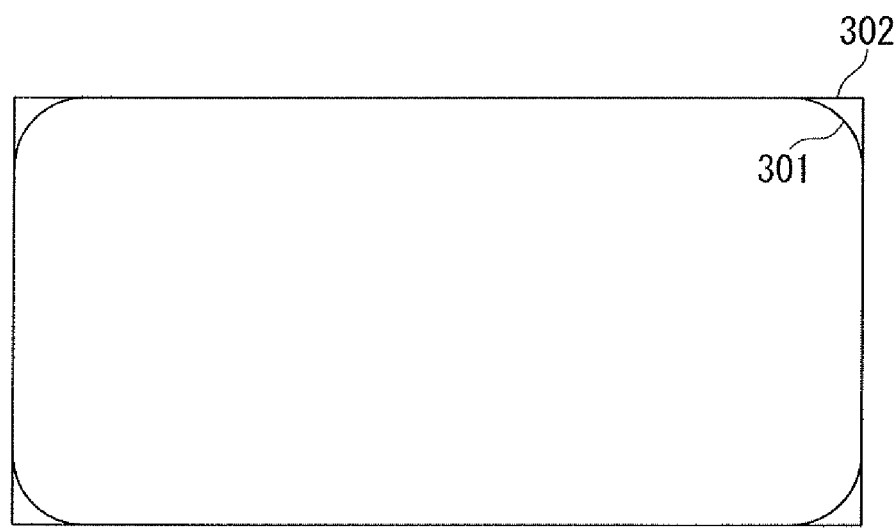
FIG. 2 is a diagram illustrating a parameter for calculating squareness and an outline of an object according to the first embodiment.

An example of the squareness will be described with reference to FIG. 2. For example, the squareness is a ratio of an area $S_C$ surrounded by an outline 301 of an object to an area $S_L$ of a rectangle 302 with the minimum size including the outline 301 of the object therein, which is shown in FIG. 2. This squareness comes closer to 1 as the object is more angulated.

A feature quantity representing a color is, for example, a CIE (Commission Internationale de l'eclairage) 1976 (L*, a*, b*) color space. Here, L* is lightness, and a* and b* are hues (color-opponent dimensions). The image analysis unit 7 calculates an average of L*, a*, and b* calculated based on the pixel values surrounded by the outline of each object and defines the calculated value as the feature quantity representing a color.

The image analysis unit 7 calculates position information $o_p$ and trajectory-of-motion information $\xi$ of the object o of which the outline is extracted. For example, the image analysis unit 7 detects the center of coordinates in the horizontal direction and the vertical direction of the part surrounded by the extracted outline. The position information $o_p$ is, for example, coordinates in the horizontal direction and the vertical direction of the detected center. The image analysis unit 7 defines the trajectory-of-motion information $\xi$, for example, by the use of the following processes. (a) The image analysis unit 7 calculates the position of an object for each frame interval including a predetermined number of frames and defines the time when the variation in position is greater than a predetermined threshold as a motion start time. (b) The image analysis unit 7 detects an end of motion based on the fact that the period of time when the variation in position is equal to or less than the predetermined threshold is continued for a predetermined time or more. The start time of this period of time is defined as a motion end time.

The image analysis unit 7 outputs the image feature quantity $o_f$, the position information $o_p$, and the trajectory-of-motion information $\xi$ of each object o to the utterance understanding unit 21.

The utterance understanding unit 21 determines or selects conceptual structure information z' including a word sequence based on a robot command grammar based on the speech information s input from the speech recognition unit 5 and the image feature quantity $o_f$ and the position information $o_p$ input from the image analysis unit 7. Here, the conceptual structure information is speech information based on the robot command grammar. For example, the conceptual structure information is information representing a word sequence including a phrase indicating at least one object as a motion target and a phrase indicating at least one motion. The motion target is referred to as a trajector and information t' indicating the trajector is referred to as trajectory information t'.

Here, when two or more objects o are detected, the utterance understanding unit 21 determines or selects information l' representing what object a landmark is (hereinafter, referred to as "landmark information l'"). The landmark is an object serving as a reference point of a motion.

The utterance understanding unit 21 determines the trajectory-of-motion information $\xi'$ maximizing the likelihood based on position information $o_{t',p}$ of a trajector, position information $o_{l',p}$ of a landmark (when it is determined or selected), and command lexicon information to be described later. The trajectory-of-motion is time-series data of the coordinates of a trajector in a motion. A set $a'=(t', \xi')$ of the trajector information t' and the trajectory-of-motion information $\xi'$ is referred to as action information. The utterance understanding unit 21 constructs the action information a' based on the trajector information t' and the trajectory-of-motion information $\xi'$ and outputs the action information a' to the motion confidence degree calculating unit 223.

The utterance understanding unit 21 outputs the conceptual structure information z' to the speech confidence degree calculating unit 221. The utterance understanding unit 21 extracts information of a phrase $w'_T$ representing the trajector and information of a phrase $w'_L$ representing the landmark, which are included in the conceptual structure information z', and outputs the information of the phrases $w'_T$ and $w'_L$, the trajector information t', the landmark information l', the image feature quantity $o_{t',f}$ of a trajector and the image feature quantity $o_{l',f}$ of a landmark to the image confidence degree calculating unit 222. The utterance understanding unit 21 extracts information of a phrase $w'_M$ representing a motion, which is included in the conceptual structure information z', and outputs the information of a phrase $w'_M$, the action information a', the landmark information l', the position information $o_{t',p}$ of a trajector, and the position information $o_{l',p}$ of a landmark to the motion confidence degree calculating unit 223. The utterance understanding unit 21 outputs the action information a' and the position information $o_{t',p}$ of a trajectory to the motion control unit 8. For example, like when the number of objects detected is only 1, when the landmark information l' is not determined, the utterance understanding unit 21 does not output the landmark information l', the image feature quantity $o_{l',f}$ of a landmark, and the position information $o_{l',p}$ of a landmark.

The robot command grammar and the function and configuration of the utterance understanding unit 21 will be described later.

The phoneme acoustic model storage unit 23 stores phoneme acoustic model information A. The phoneme acoustic model information includes a probability set corresponding to transition from a phoneme to a subsequent phoneme in the speech information s and an acoustic feature quantity. The phoneme network storage unit 24 stores phoneme network information $G_p$. The phoneme network information includes a probability set of each phoneme sequence allowable in a language system. The Japanese phoneme network does not allow a phoneme sequence in which two or more consonants are continued (that is, the probability is zero) and allows a sequence of vowels, an alternate sequence of vowel and consonant, and combinations thereof (that is, the probability may have a value other than zero).

Here, the speech confidence degree calculating unit 221 calculates the conditional likelihood P(s|z';A) of the conceptual structure information z' with respect to the speech information s using the phoneme acoustic model information A stored in the phoneme acoustic model storage unit 23 based on the conceptual structure information z' input from the utterance understanding unit 21 and the speech information s input from the speech recognition unit 5.

The speech confidence degree calculating unit 221 can calculate the conditional likelihood P(s|z';A) by the use of a known method. Since the conditional likelihood P(s|z';A) is calculated in the course of recognizing speech, the speech confidence degree calculating unit 221 may not calculate the conditional likelihood P(s|z';A) but may receive the conditional likelihood P(s|z';A) calculated by the speech recognition unit 5.

The speech confidence degree calculating unit 221 calculates the maximum value $\max_{y \in L(G_p)} P(s|z';A)$ of the conditional likelihood P(s|y;A) of the phoneme sequence y allowed by the phoneme network $G_p$ stored in the phoneme network storage unit 24 with respect to the speech information s out of the likelihood with respect to the speech information s using the phoneme acoustic model information A stored in the phoneme acoustic model storage unit 23. Furthermore, the speech confidence degree calculating unit 221 calculates the degree of speech confidence $C_S$, for example, using Expression 1 based on a frame length n(s) as an analysis target of the speech information s and outputs the calculated degree of speech confidence to the command estimation value calculating unit 224.

Expression 1

$$C_S(s, z'; A, G_p) = \frac{1}{n(s)} \log \frac{P(s|z';A)}{\max_{y \in L(G_p)} P(s|y;A)} \quad (1)$$

That is, the degree of speech confidence $C_S$ calculated by Expression 1 is a value obtained by standardizing the conditional likelihood P(s|z';A) of the conceptual structure information z' with respect to the speech information s, which is given using the phoneme acoustic model information A, using the maximum value of the conditional likelihood P(s|y; A) of the allowable phoneme sequence y with respect to the speech information s as a base line. That is, the degree of speech confidence $C_S$ means the confidence that the speech information s represents the conceptual structure information z' based on the phoneme acoustic model information A. Accordingly, the degree of speech confidence $C_S$ associated with the speech based on the robot command grammar is greater than that associated with the speech not based on the robot command grammar. In Expression 1, the value is divided by the frame length n(s), which is to exclude the dependency on the frame length as the analysis target.

When the speech recognition unit 5 stores the phoneme acoustic model information A or the phoneme network information $G_P$, the speech confidence degree calculating unit 221 may use the phoneme acoustic model information A and the phoneme network information $G_P$ stored in the speech recognition unit 5 to calculate the conditional likelihood P(s|z'; A) and P(s|y;A). When the information is used, the command recognition unit 2 may not include the phoneme acoustic model storage unit 23 and the phoneme network storage unit 24.

When the speech recognition unit 5 calculates the conditional likelihood P(s|y;A), the speech confidence degree calculating unit 221 may receive the conditional likelihood P(s|y;A) from the speech recognition unit 5. In this case, the speech confidence degree calculating unit 221 may not calculate the conditional likelihood P(s|y;A).

The command lexicon storage unit 25 stores command lexicon information L. The command lexicon information L includes a parameter set of a multivariate Gaussian function approximating a distribution of feature quantities $o_f$ of an object for each word information w representing the object o. The multivariate Gaussian function is expressed by Expression 2.

Expression 2

$$\frac{g_0}{(\sqrt{2\pi})^m \sqrt{|S|}} \exp\left(-\frac{1}{2}(x-\mu)^T S^{-1}(x-\mu)\right) \quad (2)$$

Here, $g_0$ represents a proportional coefficient, $x=(x_1, x_2, \ldots, x_m)$ represents a parameter vector, and m represents a dimension, that is, the number of parameters included in one parameter vector. In addition, $\mu=(\mu_1, \mu_2, \ldots, \mu_m)$ represents an average vector and T represents a transposition of a vector. $S=(\sigma_{ij})$ (i, j=1, \ldots, m) represents an m×m covariance matrix including covariances $\sigma_{ij}$ between parameter $x_i$ and parameter $x_j$ as elements and $S^{-1}$ represents an inverse matrix of the matrix S. |S| represents a determinant of the matrix S. That is, the parameter set means a set of parameters including the proportional coefficient $g_0$, the average values and $\mu_1$, $\mu_2, \ldots, \mu_m$ of the average vector $\mu$, and the covariances $(\sigma_{ij})$(i, j=1, \ldots, m) of the matrix S.

The image confidence degree calculating unit 222 reads the parameter set corresponding to the information of a phrase $w'_T$, which is input from the utterance understanding unit 21, representing a trajector from the command lexicon storage unit 25. The image confidence degree calculating unit 222 calculates the conditional likelihood $P(o_{t',f}|w'_T;L)$ of the phrase information $w'_T$ with respect to the image feature quantity $o_{t',f}$ by the use of the Gaussian function of Expression 2 using the parameter set read from the command lexicon storage unit 25 based on the image feature quantity $o_{t',f}$ of a trajectory input from the utterance understanding unit 21. The image confidence degree calculating unit 222 calculates the maximum value of the Gaussian function using this parameter set as the maximum value $\max_{o_f} P(o_f|w'_T;L)$ of the conditional likelihood with respect to the phrase information $w'_T$. This maximum value is the maximum value among the possible image feature quantities $o_f$ based on the parameter set.

When the phrase information $w'_L$, which is input from the utterance understanding unit 21, representing a landmark exists, the image confidence degree calculating unit 222 reads a parameter set corresponding to the phrase information $w'_L$ from the command lexicon storage unit 25. The image confidence degree calculating unit 222 calculates the conditional likelihood $P(o_{l',f}|w'_L;L)$ of the phrase information $w'_L$ with respect to the image feature quantity $o_{l',f}$ by the use of the gaussian function of Expression 2 using the parameter set read from the utterance understanding unit 21 based on the image feature quantity $o_{l',f}$ of a landmark. The image confidence degree calculating unit 222 calculates the maximum value of the Gaussian function using this read parameter set as the maximum value $\max_{o_f} P(o_f|w'_L;L)$ of the conditional likelihood with respect to the phrase information $w'_L$. This maximum value is the maximum value among the possible image feature quantities $o_f$ based on the parameter set.

The image confidence degree calculating unit 222 calculates the degree of image confidence $C_I$, for example, using Expression 3.

Expression 3

$$C_I(o_{t',f}, o_{l',f}, w'_T, w'_L; L) = \log \frac{P(o_{t',f}|w'_T; L)P(o_{l',f}|w'_L; L)}{\max_{o_f} P(o_f|w'_T) \max_{o_f} P(o_f|w'_L)} \quad (3)$$

That is, the degree of image confidence $C_I$ calculated by Expression 3 is a value obtained by normalizing the conditional likelihood $P(o_{t',f}|w'_T;L)$ and $P(o_{l',f}|w'_L;L)$ of the phrase information $w'_T$ representing a trajector and the phrase information $w'_L$ representing a landmark with respect to the image feature quantity $o_{t',f}$ of the trajector and the image feature quantity $o_{l',f}$ of the landmark using the above-mentioned maximum value as a base line. That is, the degree of image confidence $C_I$ means the confidence that the object with the image feature quantity $o_{t',f}$ is the trajector represented by the phrase information $w'_T$ and the object with the image feature quantity $o_{l',f}$ is the landmark represented by the phrase information $w'_L$. When the phrase information $w'_L$ does not exist, $P(o_{l',f}|w'_{L\ and};L)$ and $\max_{o_f} P(o_f|w'_L;L)=1$ are set.

The image confidence degree calculating unit 222 outputs the calculated degree of image confidence $C_I$ to the command estimation value calculating unit 224.

The command lexicon storage unit 25 stores probability model information, which represents time-series data of the position information $o_p$ of an object in a trajectory-of-motion information $\xi$, as a part of a command lexicon L for each of the phrase information $w_M$ representing a motion and the position information $o_{l,p}$ of a landmark. In the probability model, the position information $o_p$ of an object is variable in time. The probability model is, for example, a hidden Markov model (HMM) including a probability set in which an object moves from a current position to the next position.

The motion confidence degree calculating unit 223 reads the probability model information corresponding to the phrase information $w'_M$ representing a motion and the position information $o_{l',p}$ of a landmark, which are included in the conceptual structure information z' input from the utterance understanding unit 21, from the command lexicon storage unit 25. Before this reading, the motion confidence degree calculating unit 223 determines the position information $o_{l',p}$ of a landmark based on the landmark information l' input from the utterance understanding unit 21 out of the input position information $o_p$ of an object. Similarly, the motion confidence degree calculating unit 223 determines the position information $o_{l',p}$ of a landmark based on the probability model information read based on the trajector information t' included in the action information a' input from the utterance understanding unit 21. The conditional likelihood $P(\xi'|o_{t',p},o_{l',p},w'_M;L)$ of the position information $o_{t',p}$ of a trajector, the position information $o_{l',p}$ of a landmark, and the phrase information $w'_M$ with respect to the trajectory-of-motion information $\xi'$ included in the action information a' is calculated.

To calculate the conditional likelihood $P(\xi'|o_{t',p},o_{l',p},w'_M; L)$ the motion confidence degree calculating unit 223 performs, for example, the following processes. (a) The motion confidence degree calculating unit 223 calculates a multiplication value by sequentially multiplying transition probability corresponding to the variation of the position information $o_{t',p}$ of a trajectory t' included in the read probability model information from the utterance start time to the utterance end time. The multiplication value is calculated over the entire time-series data of the possible position information in the read probability model information. All the multiplication values are added to calculate the conditional likelihood $P(o_{t',p},o_{l',p},w'_M;L)$ of the position information $o_{t',p}$ of a trajector, the position information $o_{l',p}$ of a landmark, and the phrase information $w'_M$. (b) The motion confidence degree calculating unit 223 calculates the likelihood $P(\xi;L)$ by multiplying the multiplication values for the trajectories of motion of which an error from the trajectory-of-motion information $\xi'$ is equal to or less than a predetermined value out of the position information sequences of a trajector. (c) The motion confidence degree calculating unit 223 calculates the conditional likelihood $P(\xi'|o_{t',p},o_{l',p},w'_M;L)$ by dividing the likelihood $P(\xi;L)$ by the likelihood $P(o_{t',p},o_{l',p},w'_M;L)$.

Furthermore, the motion confidence degree calculating unit 223 calculates the maximum conditional likelihood $\max_{o_f} P(\xi'|o_p,o_{l',p},w'_M;L)$ of the position information $o_p$ of an object, the position information $o_{l',p}$ of a landmark, and the phrase information $w'_M$ with respect to the trajectory-of-motion information candidates $\xi$ based on the read probability model information. Here, the trajectory-of-motion information candidate $\xi$ and the position information $o_p$ of an object are variable and the maximum value is the maximum value among the possible trajectory-of-motion information candidates $\xi$ based on the read probability model information and the position information $o_p$ of an object. The motion confidence degree calculating unit 223 calculates the degree of motion confidence $C_M$, for example, using Expression 4.

Expression 4

$$C_M(\xi', w'_M; L) = \log \frac{P(\xi'|o_{t',p}, o_{l',p}, w'_M; L)}{\max_{\xi,o_p} P(\xi|o_p, o_{l',p}, w'_M; L)} \quad (4)$$

That is, the degree of motion confidence $C_M$ calculated using Expression 4 is a value obtained by normalizing the conditional likelihood $P(\xi'|o_{t',p},o_{l',p},w'_M;L)$ of the position information $o_{t',p}$, the position information $o_{l',p}$ of a landmark, and the phrase information $w'_M$ with respect to the trajectory-of-motion information $\xi'$ by the use of the maximum value $\max_{\xi'op} P(\xi|o_p,o_{l',p},w'_M;L)$ thereof. That is, the degree of motion confidence $C_M$ means the confidence that the trajectory-of-motion information $\xi'$ is the motion represented by the phrase information $w'_M$.

The motion confidence degree calculating unit 223 outputs the calculated degree of motion confidence $C_M$ to the command estimation value calculating unit 224.

The command estimation value calculating unit 224 weights and adds the degree of speech confidence $C_S$ input from the speech confidence degree calculating unit 221, the degree of image confidence $C_I$ input from the image confidence degree calculating unit 222, and the degree of motion confidence $C_M$ input from the motion confidence degree calculating unit 223 to calculate a weighted added value. The command estimation value calculating unit 224 calculates the command estimation value. The command estimation value can be a function having the weighted added value as a parameter, monotonously increasing or decreasing with the variation of the parameter, and having a maximum value of 1 and a minimum value of 0.

The command estimation value is, for example, an MSC (Multimodal Semantic Confidence) measure. The MSC represents the realizability of the action information a', that is, the trajector information t' and the trajectory-of-motion information $\xi'$, obtained from the speech information s, scene information O, and behavioral context information q. That is, the MSC means the probability P(domain=RD|s,O,q) of an RD (Robot-Directed) speech. The MSC is, for example, $C_{MS}$(s,O,q) calculated from Expression 5.

Expression 5

$$C_{MS}(s, O, q) = \frac{1}{1 + e^{-(\theta_0 + \theta_1 C_S + \theta_2 C_I + \theta_3 C_M)}} \quad (5)$$

In Expression 5, $\theta_0$ represents a bias value and $\theta_1$, $\theta_2$, and $\theta_3$ represent weighting coefficients. That is, the $C_{MS}$(s,O,q) calculated from Expression 5 is a sigmoid function of a value obtained by adding the bias value $\theta_0$ to the weighted added value of the degree of speech confidence $C_S$, the degree of image confidence $C_I$, and the degree of motion confidence $C_M$. The function for obtaining the $C_{MS}$(s,O,q) from the weighted added value is not limited to the sigmoid function. The function may be a function monotonously increasing so that the $C_{MS}$ comes closer to 1 as the weighted added value becomes greater and the $C_{MS}$ comes closer to zero as the weighted added value becomes smaller.

A coefficient set $\Theta$ including the bias value $\theta_0$ and the weighting coefficients $\theta_1$, $\theta_2$, and $\theta_3$ are determined in advance by pre-learning to be described later. In the pre-learning, a set of the speech signal, the scene information O, and the behavioral context information q, which results in the $C_{MS}$(s,O,q) and the result d representing one of the RD speech and the OOD (Out-Of-Domain) speech, is used as a learning sample. The coefficient set $\Theta$ is calculated using a logistic regression model, for example, so as to maximize the likelihood expressed by Expression 6.

Expression 6

$$P(d|\Theta)C'_S = \prod_{i=1}^{N} (C^i_{MS})^{d_i} (1 - C^i_{MS})^{1-d_i} \quad (6)$$

In Expression 6, d represents $d=(d^1, \ldots, d^N)$ and $d^i$ is result data based on the i-th learning sample. The result data is, for example, $d^i=1$ in RD speech and $d^i=0$ in OOD speech. $C_{MS}^i$ represents $C_{MS}(s^i,O^i,q^i)$ based on the i-th learning sample. To maximize the likelihood expressed by Expression 6, for example, Fischer's scoring algorithm can be used.

The command estimation value calculating unit 224 outputs the calculated command estimation value to the motion control instructing unit 225. When the phrase confidence degree calculating unit 22 includes only one of the image confidence degree calculating unit 222 and the motion confidence degree calculating unit 223, the command estimation value calculating unit 224 may calculate the weighted added value by adding one of the degree of image confidence $C_I$ and the degree of motion confidence $C_M$ to the degree of speech confidence $C_S$.

The motion control instructing unit 225 determines that speech uttered by a user is RD speech, that is, a robot command, when the command estimation value input from the command estimation value calculating unit 224 is greater than a predetermined threshold value δ. Therefore, the motion control instructing unit 225 outputs a motion instructing signal to the motion control unit 8 and the command candidate selecting unit 216 of the utterance understanding unit 21 when the command estimation value is greater than δ. The motion control instructing unit 225 determines that the speech uttered by the user is OOD speech, that is, is not a robot command, when the command estimation value is equal to or smaller than δ. At this time, the motion control instructing unit 225 does not output the motion instructing signal to the motion control unit 8 and the command candidate selecting unit 216 of the utterance understanding unit 21.

The action information a', the position information $o_{t',p}$ of a trajector, the landmark information l', and the position information $o_{l',p}$ of a landmark (only when it is detected) are input to the motion control unit 8 from the utterance understanding unit 21. The driving power model storage unit 9 stores power model information in which the action information is correlated with time-series data pattern information of the power supplied to components constituting at least a part of the motion mechanism unit 10. In some time-series data pattern information, the time-series data of power may be variable due to at least one of the position information $o_{t',p}$ of an object, that is, a trajector and the position information $o_{l',p}$ of a landmark. For example, in the time-series data of power supplied to the components regarding a motion of "place-on", the position information $o_{t',p}$ of a trajector at the time of starting the corresponding motion depends on the position information $o_{l',p}$ of a landmark at the time of ending the motion.

When receiving the motion instructing signal from the motion control instructing unit 225, the motion control unit 8 reads the power model information corresponding to the action information a' from the driving power model storage unit 9 and determines the time-series data of power to be supplied to the component. When the power model information is variable due to the position information $o_{t',p}$ or the position information $o_{l',p}$, the motion control unit 8 determines the time-series data of power to be supplied to the component based on the power model information and the position information $o_{t',p}$ of a trajectory or the position information $o_{l',p}$ of a landmark indicated by the action information a'. The motion control unit 8 supplies the power to the component based on the determined time-series data of power. The component is, for example, a manipulator or a multi-finger grasper.

By causing the motion control unit 8 to supply the power to the component and causing the component to operate, the motion mechanism unit 10 carries out an action based on the user's speech recognized as a robot command. On the other hand, when the motion instructing signal is not input to the motion control unit 8 from the motion control instructing unit 225, the power is not supplied to the component of the motion mechanism unit 10 from the motion control unit 8 and the motion mechanism unit 10 does not carry out the action based on the user's speech.

Figure 3:
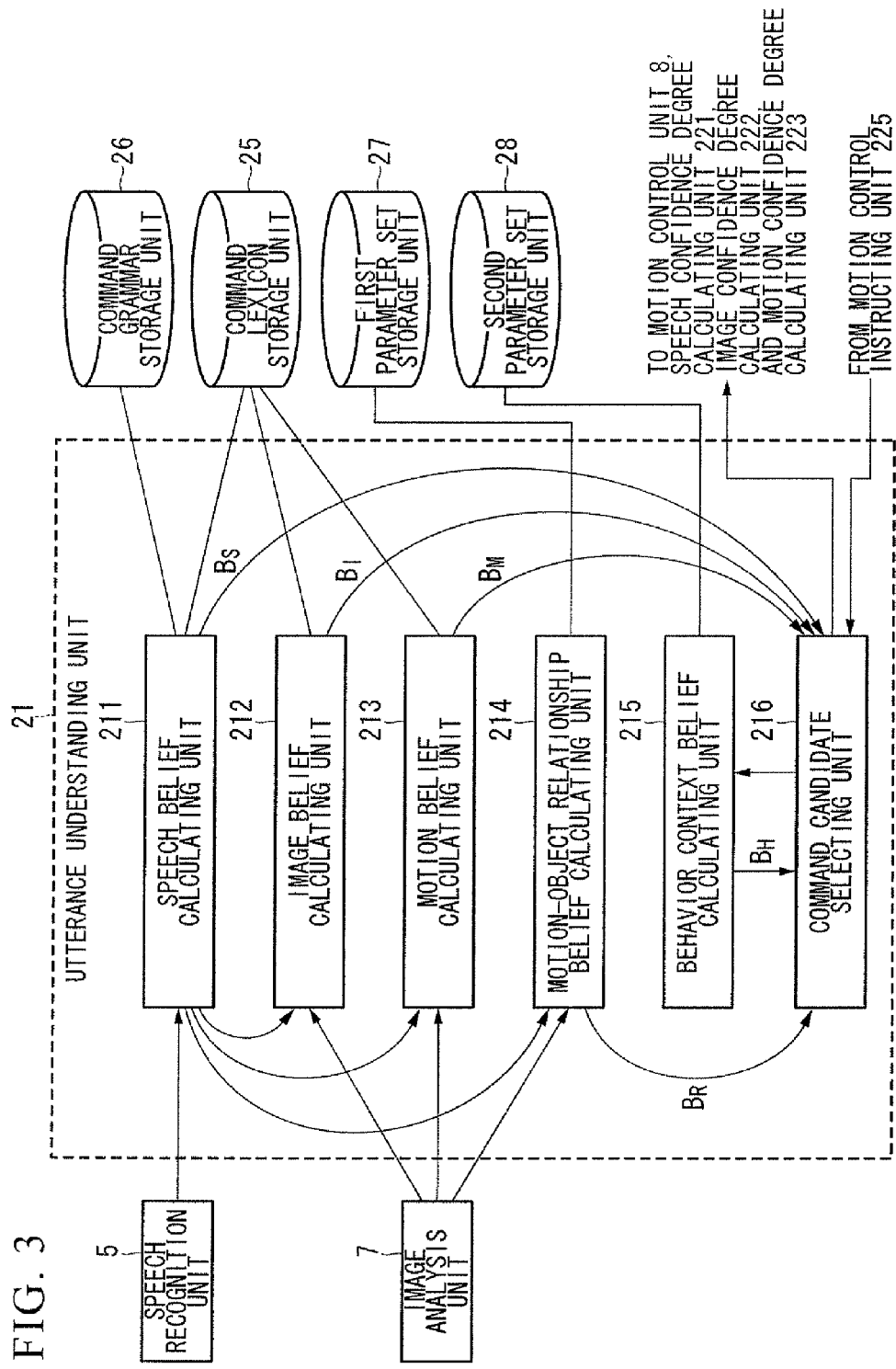
FIG. 3 is a block diagram illustrating the configuration of an utterance understanding unit according to the first embodiment.

The configuration of the utterance understanding unit 21 will be described with reference to FIG. 3. FIG. 3 is a block diagram illustrating an example of the utterance understanding unit 21 according to this embodiment. The utterance understanding unit 21 includes speech belief calculating unit 211, an image belief calculating unit 212, a motion belief calculating unit 213, a motion-object relationship belief calculating unit 214, a behavioral context belief calculating unit 215, and a command candidate selecting unit 216. The command recognition unit 2 further includes a command grammar storage unit 26, a first parameter set storage unit 27, and a second parameter set storage unit 28. The utterance understanding unit 21 uses information stored in advance in the command lexicon storage unit 25, the command grammar storage unit 26, the first parameter set storage unit 27, and the second parameter set storage unit 28.

The command lexicon storage unit 25 stores the command lexicon information L as described above. The command lexicon information L includes likelihood information in which word sequence information is correlated with concept information. Each of the concept information includes a feature quantity and action information of an object in a still image and information representing a particle. The command lexicon includes a parameter set of a multivariate Gaussian function approximating a distribution of feature quantities $o_f$ of an object for each phrase information w representing the object and being included in the conceptual information.

As described above, each of the concept information includes probability model information including a set of probabilities of the time-series data of the position information $o_p$ of an object with the trajectory-of-motion information ξ for each phrase information $w_M$ representing a motion and every position information $o_{l,p}$ of a landmark. In this probability model, the position information $o_p$ of an object is variable with time. The probability model is, for example, an HMM (Hidden Markov Model) including a probability set in which an object moves from a position at the current time and to a position at the next time.

The command grammar storage unit 26 stores statistical language model information $G_r$ including the likelihood of word sequence information possible as a robot command, that is, conceptual structure information candidates z.

Figure 7:
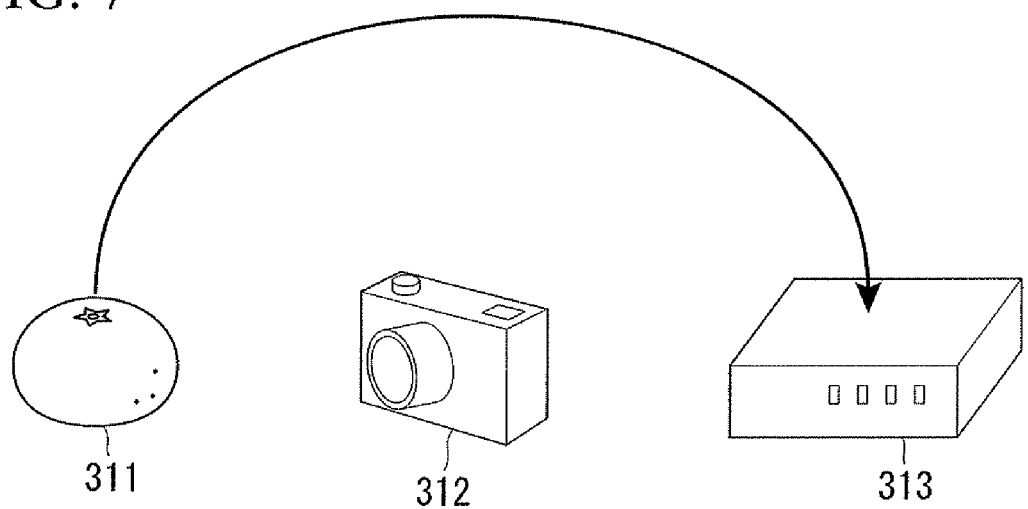
FIG. 7 is a conceptual diagram illustrating an example of a scene expressed by a conceptual structure according to the second embodiment.

In this embodiment, according to the robot command grammar, the speech information s is expressed by the conceptual structure information candidates z. Examples of the conceptual structure information candidates z will be described below. The conceptual structure information candidate z includes the phrase information $w_M$ representing a motion and the phrase information $w_T$ representing a trajector and is expressed by z=[(motion:$w_M$), (trajector:$w_T$)]. Alternatively, the conceptual structure information candidate z includes the phrase information $w'_L$ representing a landmark in addition to the phrase information $w_M$ representing a motion and the phrase information $w_T$ representing a trajector and may be expressed by z=[(motion:$w_M$), (trajector:$w_T$), (landmark $w_L$)]. For example, regarding speech of "Place the orange on the box", the conceptual structure information z is z=[(motion:"place-on"), (trajector: "orange"), (landmark: "box"). FIG. 7 is an example of a scene represented by this conceptual structure information. Here, FIG. 7 shows three objects, that is, "orange" 311, "camera" 312, and "box" 313. The "orange" 311 is a trajector to be moved and the "box" 313 is a landmark used as a reference point of the motion. The variation in position of the trajector indicated by an arrow is a motion.

The first parameter set storage unit 27 stores a parameter set R of the multivariate gaussian function approximating a distribution of the image feature quantity $o_{t',f}$ of a trajector and the image feature quantity $o_{l',f}$ of a landmark every word information $w_M$ representing a motion.

The second parameter set storage unit 28 stores a parameter H for each object information and behavioral context information q. The behavioral context information is a kind of factor characterizing the surrounding situations of a user and objects when a robot takes an action. For example, the behavioral context information q includes the trajector information t' and the landmark information l' determined or selected previously. In this case, parameter H is a scale indicating whether an object to be instructed is adequate.

The speech belief calculating unit 211 calculates the conditional likelihood P(s|z;L) of the conceptual structure information candidate z as a recognition result candidate in the speech information s input from the speech recognition unit 5 based on the command lexicon information L read from the command lexicon storage unit 25. The method of calculating the conditional likelihood P(s|z;L) is the same as the above-mentioned method of calculating the conditional likelihood P(s|z';L). The speech belief calculating unit 211 reads the likelihood $P(z;G_r)$ corresponding to the conceptual structure information candidate z from the command grammar storage unit 26. The speech belief calculating unit 211 calculates a speech belief function $B_S$, for example, using Expression 7.

Expression 7

$$B_S = \log P(s|z;L)P(z;G_r) \quad (7)$$

That is, the speech belief function $B_S$ is conditional probability of the conceptual structure information candidate z based on the command lexicon information L in the speech information s. The speech belief calculating unit 211 outputs the speech belief function $B_S$ to the command candidate selecting unit 216. The speech belief calculating unit 211 outputs the phrase information $w_T$ representing a trajector and the phrase information $w_L$ representing a landmark (only when it is included in the conceptual structure information candidate z), which are included in the conceptual structure information candidate z, to the image belief calculating unit 212 and outputs the phrase information $w_M$ representing a motion to the motion belief calculating unit 213 and the motion-object relationship belief calculating unit 214.

The image belief calculating unit 212 reads the parameter set corresponding to the phrase information $W_T$ representing a trajector input from the speech belief calculating unit 211 from the command lexicon storage unit 25. The image belief calculating unit 212 calculates the likelihood $P(o_{t,f}|w_T;L$ of the phrase information $W_T$ with respect to the image feature quantity $o_{t,f}$ by the use of the Gaussian function of Expression 2 using the read parameter set based on the image feature quantity $o_{t,f}$ of a trajector input from the image analysis unit 7. The image belief calculating unit 212 reads the parameter set corresponding to the phrase information $w_L$ representing a landmark from the command lexicon storage unit 25. The image belief calculating unit 212 calculates the likelihood $P(o_{l,f}|w_L;L)$ of the phrase information $w_L$ with respect to the image feature quantity $o_{l,f}$ by the use of the Gaussian function of Expression 2 using the read parameter set based on the image feature quantity $o_{l,f}$ of a landmark input from the image analysis unit 7. The image belief calculating unit 212 calculates an image belief function $B_I$, for example, using Expression 8.

Expression 8

$$B_I = \log P(o_{t,f}|w_T;L) + \log P(o_{l,f}|w_L;L) \quad (8)$$

That is, the image belief function $B_I$ is the likelihood of the phrase information $w_T$ and $w_L$ based on the command lexicon L with respect to the image feature quantity $o_{t,f}$ and $o_{l,f}$. The image belief calculating unit 212 outputs the image belief function $B_I$ to the command candidate selecting unit 216.

When the phrase information $w_L$ representing a landmark is not included in the conceptual structure information candidate z, the value of $\log P(o_{l,f}|W_L;L)$ in Expression 8 need not be calculated and may be set to zero.

The motion belief calculating unit 213 reads the probability model information corresponding to the phrase information $w_M$ representing a motion, which is input from the speech belief calculating unit 211, from the command lexicon storage unit 25. The motion belief calculating unit 213 receives the position information $o_{t,p}$ of a trajector, the position information $o_{l,p}$ of a landmark, and the trajectory-of-motion information ξ from the image analysis unit 7. The motion belief calculating unit 213 calculates the conditional likelihood $P(\xi|o_{t,p},o_{l,p},w_M;L)$ of the position information $o_{t,p}$ of a trajector, the position information $o_{l,p}$ of a landmark, and the phrase information $w_M$ with respect to the trajectory-of-motion information candidate ξ based on the read probability model information. The method of calculating the conditional likelihood is, for example, the same as the above-mentioned method of calculating the conditional likelihood $P(\xi'|o_{t',p},o_{l',p},w'_M;L)$ This conditional likelihood is the motion belief function $B_M$. The motion belief calculating unit 213 outputs the calculated motion belief function $B_M$ to the command candidate selecting unit 216.

The motion-object relationship belief calculating unit 214 reads a parameter set R corresponding to the phrase information $w_M$ representing a motion, which is input from the speech belief calculating unit 211, from the first parameter set storage unit 27. The motion-object relationship belief calculating unit 214 calculates the conditional likelihood $P(o_{t,f},o_{l,f}|w_M;R)$ of the phrase information $w_M$ with respect to the image feature quantity $o_{t,f}$ and the image feature quantity $o_{l,f}$, for example, by the use of the gaussian function of Expression 2 using the read parameter set R based on the image feature quantity $o_{t,f}$ of a trajector and the image feature quantity $o_{l,f}$ of a landmark, which are input from the image analysis unit 7. This conditional likelihood is a motion-object relationship belief $B_R$. The motion-object relationship belief calculating unit 214 outputs the calculated motion-object relationship belief $B_R$ to the command candidate selecting unit 216.

The behavioral context belief calculating unit 215 receives the trajector information t' and the landmark information l' when it is previously determined that the speech is a robot command from the command candidate selecting unit 216 to be described later (for example, when it is previously determined that the speech information s is the RD speech). The behavioral context belief calculating unit 215 uses the received information as the behavioral context information q. Accordingly, the behavioral context belief calculating unit 215 reads the first parameter $H_t$ corresponding to the current trajector information candidate t and the behavioral context information q from the second parameter set storage unit 28. The read first parameter $H_t$ is expressed by $B_H(t,q;H)$. The behavioral context belief calculating unit 215 reads a second parameter $H_l$ corresponding to the current landmark information candidate l and the behavioral context information q from the second parameter set storage unit 28. The read second parameter $H_l$ is expressed by $B_H(l,q;H)$. The behavioral context belief calculating unit 215 calculates the behavioral context belief function $B_H$ by adding the first parameter and the second parameter, for example, as expressed by Expression 9.

Expression 9

$$B_H = B_H(t,q;H) + B_H(l,q,H) \quad (9)$$

The behavioral context belief calculating unit 215 outputs the calculated behavioral context function $B_H$ to the command candidate selecting unit 216.

As described above, the behavioral context belief function $B_H$ is a scale representing whether an object is adequate as an operation target. In this embodiment, the trajector information t' and the landmark information l' in the speech information s previously determined as RD speech are used as the behavioral context information q. That is, the behavioral context information q is the landmark information l' input from the command candidate selecting unit 216 and the trajector information t' included in the action information a'. Accordingly, according to this embodiment, it is possible to stably determine what object is a trajector or not or what object is a landmark or not, and to precisely recognize a motion based on speech, thereby correctly recognizing a command.

The command candidate selecting unit 216 weights and adds the speech belief function $B_S$, the image belief function $B_I$, the motion belief function $B_M$, the motion-object relationship belief function $B_R$, and the behavioral context belief function $B_H$ input from the speech belief calculating unit 211, the image belief calculating unit 212, the motion belief calculating unit 213, the motion-object relationship belief calculating unit 214, and the behavioral context belief calculating unit 215, respectively, and calculates a shared belief function $\Psi(s, a, O, q, L, G_r, R, H, \Gamma)$, for example, using Expression 10.

Expression 10

$$\Psi(s,a,O,q,L,G_r,R,H,\Gamma) = \gamma_1 B_S + \gamma_2 B_I + \gamma_3 B_M + \gamma_4 B_R + \gamma_5 B_H \quad (10)$$

Here, $\{\gamma_1, \gamma_2, \gamma_3, \gamma_4, \gamma_5\} = \Gamma$ represents a weighting coefficient set. The weighting coefficient set $\Gamma$ is acquired in advance by pre-learning. The shared belief function $\Psi$ is a scale representing a degree of association between the speech information and the action information candidate a to be executed, that is, a set of the trajector information candidate t and the trajectory-of-motion information candidate $\xi$, based on the given scene information O.

Regarding other conceptual structure information candidates z and landmark information candidates l possible in the speech information s, the speech belief calculating unit 211, the image belief calculating unit 212, the motion belief calculating unit 213, the motion-object relationship belief calculating unit 214, and the behavioral context belief calculating unit 215 calculate the functions $B_S$, $B_I$, $B_M$, $B_R$, and $B_H$, respectively, and the command candidate selecting unit 216 calculates the shared belief function $\Psi$. The command candidate selecting unit 216 detects the maximum value from the calculated shared belief function $\Psi$ and selects or determines the conceptual structure information candidate z and the landmark information candidate l having a maximum value. The selected conceptual structure information is represented by z' and the selected landmark information is represented by l'. Depending on the input to the utterance understanding unit 21, the command candidate selecting unit 216 may not select the landmark l' when the conceptual structure information z' not including the phrase information $w'_L$ representing the landmark l is selected.

The command candidate selecting unit 216 selects or determines the action information a' having the maximum value from the calculated shared belief function $\Psi$. The selected action information a' is expressed, for example, by Expression 11.

Expression 11

$$a' = (t', \xi') = \underset{a}{\mathrm{argmax}} \Psi(s, a, O, q, L, G_r, R, H, \Gamma) \quad (11)$$

The command candidate selecting unit 216 outputs the conceptual structure information z' to the speech confidence degree calculating unit 221. The command candidate selecting unit 216 selects the phrase information $w'_T$ representing a trajector, the phrase information $w'_L$ representing a landmark, the image feature quantity $o_{t',f}$ of a trajector, and the image feature quantity $o_{l',f}$ of a landmark, which are included in the trajector information t', the landmark information l', and the conceptual structure information z', and outputs the selected information to the image confidence degree calculating unit 222. The command candidate selecting unit 216 selects the phrase information $w'_M$ representing a motion, which is included in the action information a', the landmark information l', the conceptual structure information z', the position information $o_{t',p}$ of a trajector, and the position information $o_{l',p}$ of a landmark, and outputs the selected information to the motion confidence degree calculating unit 223.

The command candidate selecting unit 216 selects the position information $o_{t',p}$ of a trajector, the position information $o_{l',p}$ of a landmark, the action information a', and the landmark information l' and outputs the selected information to the motion control unit 8. When a motion instructing signal is input from the motion control instructing unit 225 of the command recognition unit 2, the command candidate selecting unit 216 outputs the selected landmark information l' and the trajector information t' included in the action information a' to the behavioral context belief calculating unit 215. When the phrase information $w'_L$ representing a landmark is not included in the conceptual structure information z', the landmark information l' is not determined and thus the command candidate selecting unit 216 may not output the landmark information l', the image feature quantity $o_{l',f}$ thereof, and the position information $o_{l',p}$ thereof.

In this way, according to this embodiment, the command recognition unit 2 calculates the command estimation value $C_{MS}$ using the degree of image confidence $C_I$ or the degree of motion confidence $C_M$ in addition to the degree of speech confidence $C_S$. At this time, the surrounding scene acquired from the image information, that is, the feature quantity or position of a trajector or a landmark, is considered. Accordingly, according to this embodiment, it is possible to accurately determine whether a user's speech is directed to a robot, that is, is a robot command, depending on the surroundings.

It cannot be concluded that the user's speech is necessarily based on the robot command grammar. For example, speech of "it is an orange" includes a word "orange" representing an object, but does not include a phrase representing a motion. A user's speech representing one meaning may be expressed in different ways. For example, instead of a phrase "place-on" representing a motion, phrases "put" and "load" having the same meaning may be used.

Therefore, in this embodiment, the degree of speech confidence and the degree of image confidence or the degree of motion confidence are calculated based on a conceptual structure or the likelihood of phrases constituting the conceptual structure. As a result, when the speech information s from the user is not based on the robot command grammar or when a phrase other than the phrases registered in the command lexicon is uttered, the possibility that the speech is a robot command is not completely excluded. Accordingly, according to this embodiment, it is possible to control a robot's motion desired by the user in this case.

Second Embodiment

Figure 4:
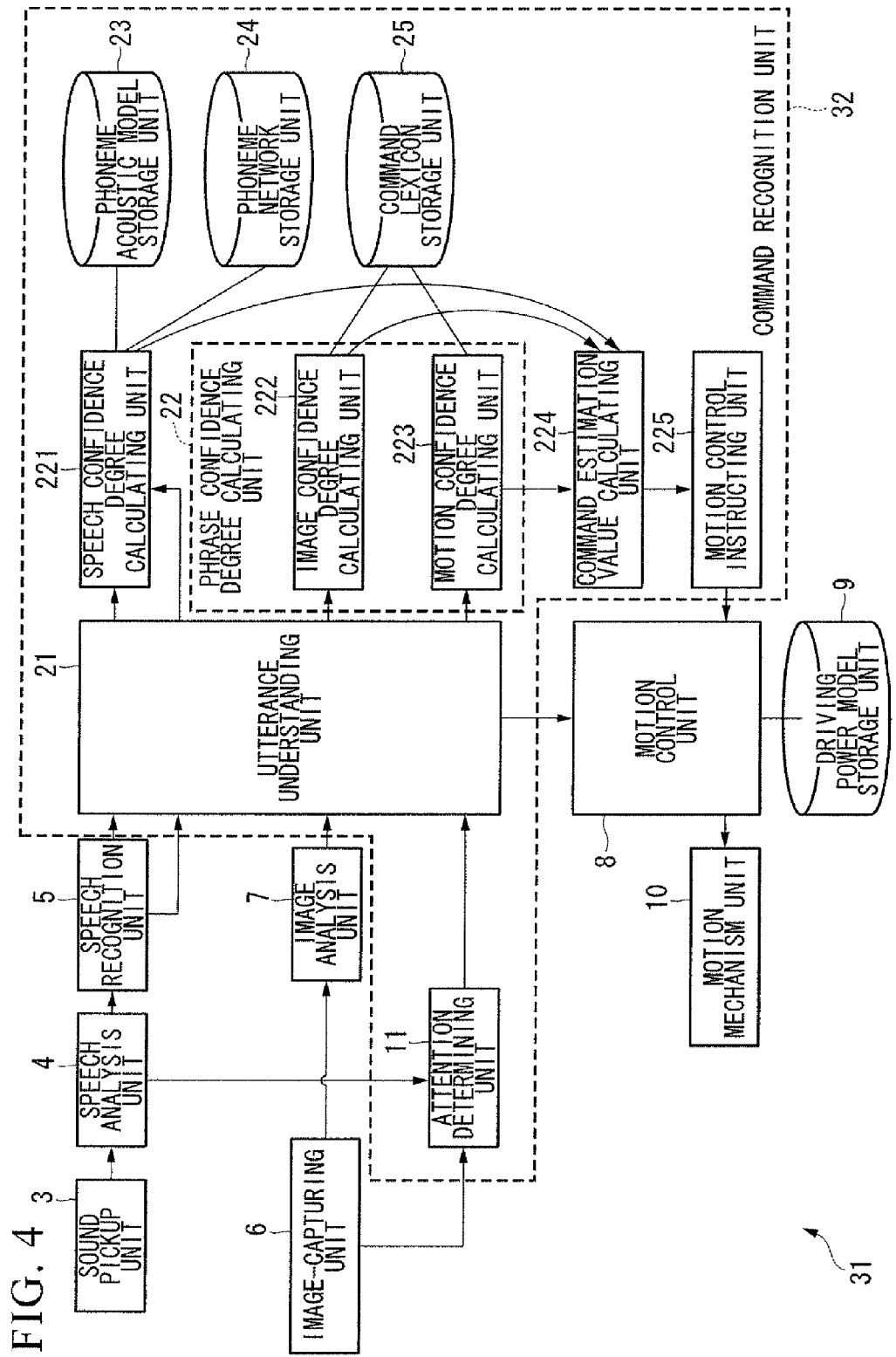
FIG. 4 is a conceptual block diagram illustrating a command recognition robot according to a second embodiment of the invention.

Hereinafter, a second embodiment of the invention will be described with reference to FIG. 4. FIG. 4 is a block diagram illustrating a command recognition robot 31 according to this embodiment. A command recognition unit 32 is the command recognition device according to the invention. The command recognition robot 31 and the command recognition unit 32 includes an attention determining unit 11 in addition to the configuration of the command recognition robot 1 and the command recognition unit 2 according to the first embodiment shown in FIG. 1. The configurations and functions of the other elements are the same as those of the command recognition robot 1 and the command recognition unit 2 according to the first embodiment, as long as they are not particularly mentioned.

The speech analysis unit 4 outputs speech signal of an interval, which is determined as including speech, to the attention determining unit 11. The image-capturing 6 outputs a photographed image signal to the attention determining unit 11.

The attention determining unit 11 determines whether a user appearing in an image gives attention to the command recognition robot 31 based on the speech signal input from the speech analysis unit 4 and the image signal input from the image-capturing 6 by the use of a known method. For example, the attention determining unit 11 sequentially detects the user's face orientation $\alpha_f$ and determines that the user gives attention to the command recognition robot 31 when the ratio of the period of time when a state where an angle difference $\Delta\alpha$ from a reference direction (for example, an optical axis direction of the image-capturing 6) is smaller than a predetermined threshold value $\beta$ is continued to the interval determined as including speech is greater than a predetermined ratio T. Here, the threshold value $\beta$ is, for example, 5°. The ratio T is, for example, 50%. When the angle difference $\Delta\alpha$ is equal to or greater than the threshold value $\beta$ or when the ratio of the period of time when a state where the angle difference $\Delta\alpha$ is smaller than the threshold value $\beta$ is continued to the interval determined as including speech is equal to or smaller than the ratio T, the attention determining unit 11 determines that the user does not give attention to the command recognition robot 31.

The attention determining unit 11 performs, for example, the following processes to detect the face orientation $\alpha_f$. (a) The attention determining unit 11 extracts three or more feature points of the face such as tails of eyes and lips from the input image signal. Here, the attention determining unit 11 previously records the feature points of the face photographed when the user is directed to the front of the image-capturing 6 as reference feature points. (b) The attention determining unit 11 predicts a variation in distance between the reference feature points with the variation in orientation. (c) The attention determining unit 11 calculates an error between the predicted distance and the distance among the sequentially extracted feature points. (d) The attention determining unit 11 detects a direction in which the error is the smallest as the face orientation $\alpha_f$. To detect the face orientation $\alpha_f$, other image processing methods or gaze detecting methods may be used.

When determining that the user gives attention to the command recognition robot 31, the attention determining unit 11 generates a motion start signal and outputs the generated motion start signal to the utterance understanding unit 21. The utterance understanding unit 21 enables the above-mentioned motion when receiving the motion start signal from the attention determining unit 11. When determining that the user does not give attention to the command recognition robot 31, the attention determining unit 11 outputs a motion stop signal to the utterance understanding unit 21. When receiving the motion stop signal from the attention determining unit 11, the utterance understanding unit 21 stops the above-mentioned motion. Accordingly, the utterance understanding unit 21 is activated when the user gives attention to the command recognition robot 31, and is not activated when the user does not give attention to the command recognition robot. As a result, only when it is determined that the user gives attention to the command recognition robot, the motion control instructing unit 225 determines whether the speech information s from the user is RD speech. Accordingly, even when the speech information s from the user is based on or similar to the robot command grammar but the user does not give attention to the robot, this embodiment can solve the problem in that the speech information s is recognized as a robot command.

In this embodiment, the attention determining unit 11 may output the motion start signal and the motion stop signal to the command recognition unit 32 or the motion control unit 8, and the motion control instructing unit 225 or the motion control unit 8 may be activated until the motion stop signal is input after the motion start signal is input. In this case, similarly to the above-mentioned embodiment, it is possible to solve the problem in that the speech information is recognized as the robot command even when the user does not give attention to the robot.

Figure 5:
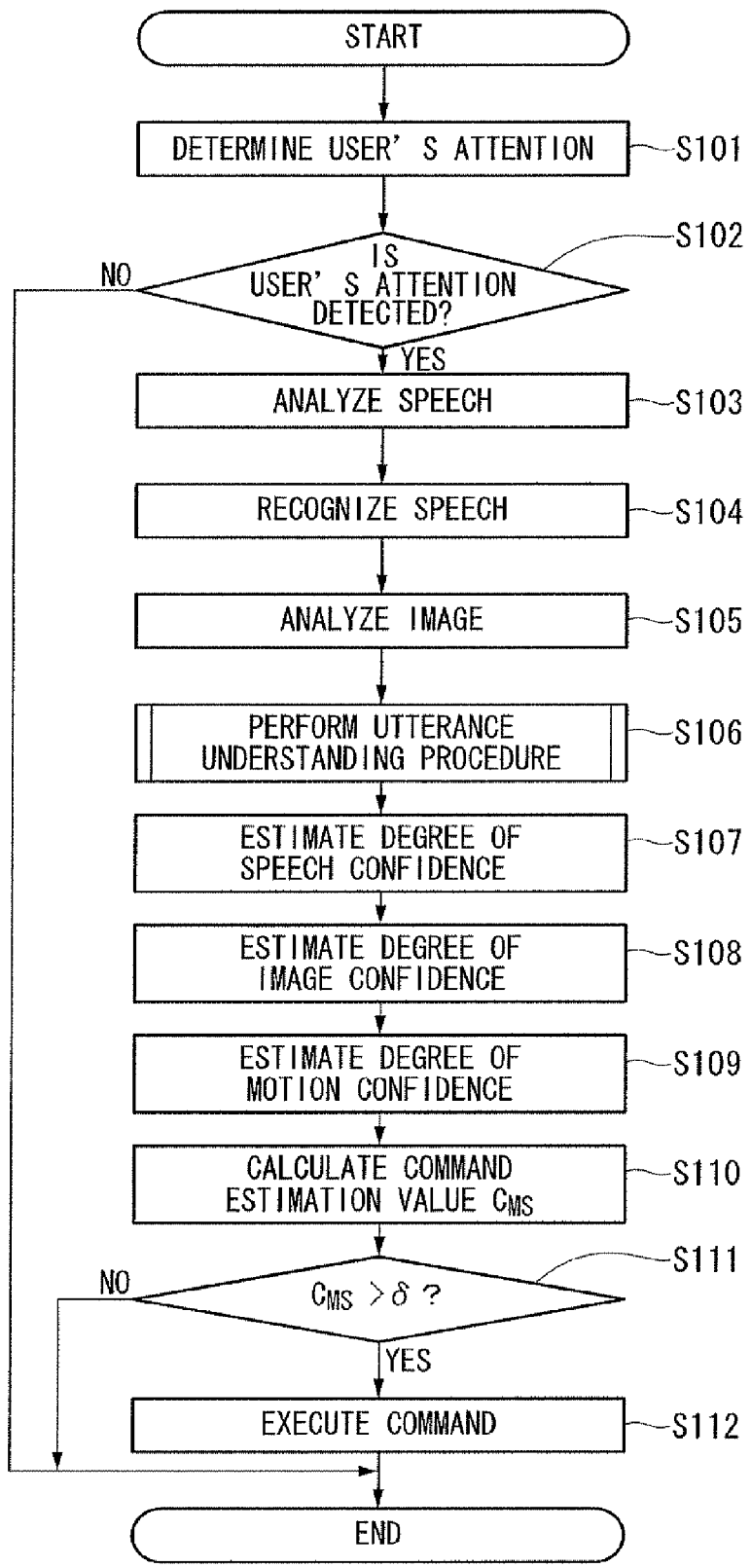
FIG. 5 is a flow diagram illustrating a command control method according to the second embodiment.
Figure 6:
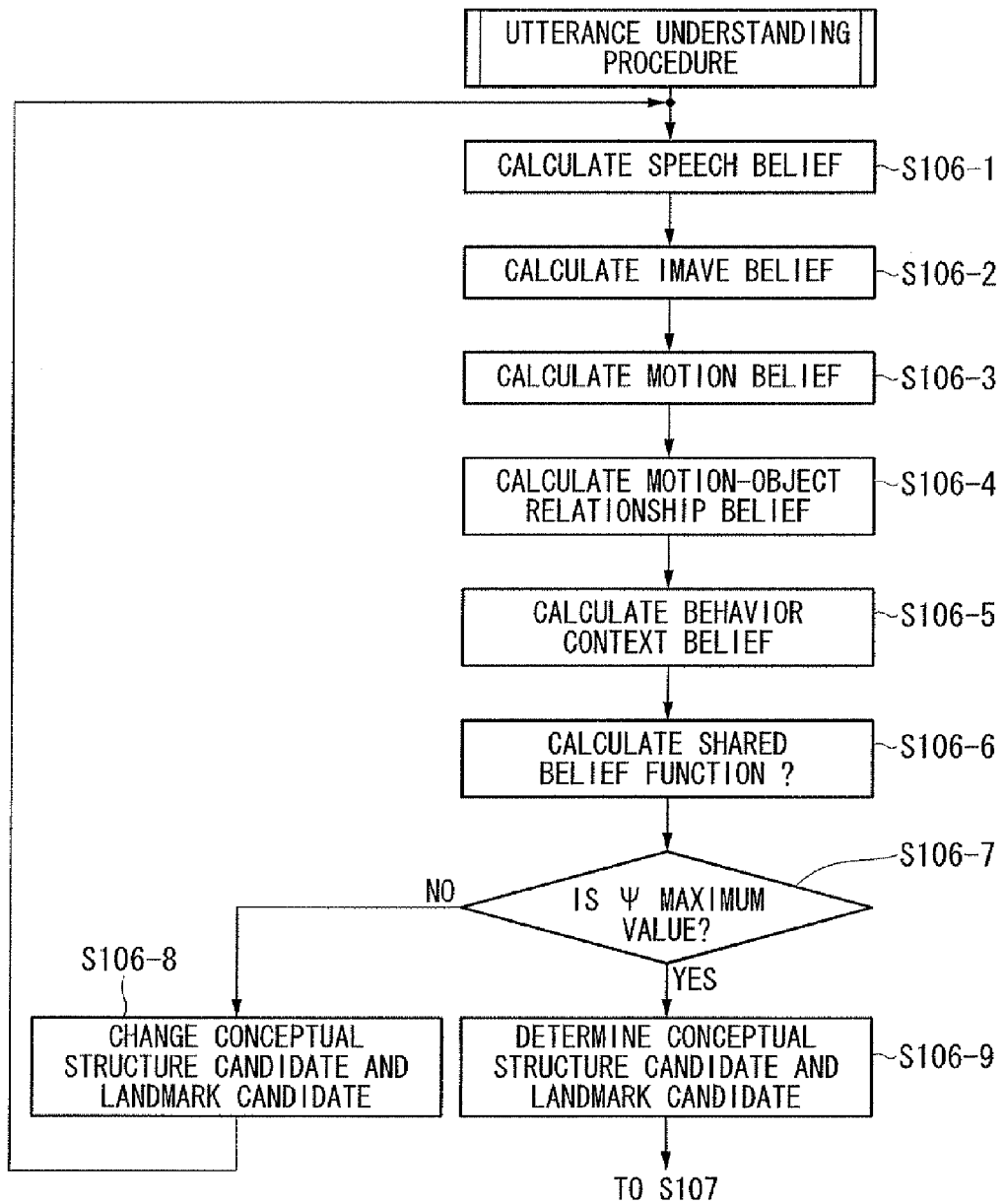
FIG. 6 is a flow diagram illustrating an utterance understanding procedure according to the second embodiment.

A command control method according to this embodiment will be described with reference to the drawings. FIG. 5 is a flow diagram illustrating the command control method according to this embodiment. The functions or configurations of the elements are the same as those of the above-mentioned command recognition robot 31.

(step S101) The attention determining unit 11 determines whether a user appearing in an image gives attention to the robot based on the speech signal input from the speech analysis unit 4 and the image signal input from the image-capturing unit 6. For example, the attention determining unit 11 sequentially detects the user's face orientation $\alpha_f$ and determines that the user gives attention to the command recognition robot 31 when the ratio of the period of time when a state where an angle difference $\Delta\alpha$ from a reference direction (for example, an optical axis direction of the image-capturing 6) is smaller than a predetermined threshold value $\beta$ is continued to the interval determined as including speech is greater than a predetermined ratio T. When the angle difference $\Delta\alpha$ is equal to or greater than the threshold value $\beta$ or when the ratio of the period of time when a state where the angle difference $\Delta\alpha$ is smaller than the threshold value $\beta$ is continued to the interval determined as including speech is equal to or smaller than the ratio T, the attention determining unit 11 determines that the user has not given attention to the command recognition robot 31.

(step S102) The attention determining unit 11 performs the processes of steps S103 and S105, when determining that the user gives attention to the command recognition robot 31 (Y in step S102). The command recognition robot 31 may perform the processes of steps S103 and S105 in parallel, or may sequentially perform the processes of steps S103 and S105.

The attention determining unit 11 ends the flow of processes when determining that the user does not give attention to the command recognition robot 31 (N in step S102).

(step S103) The speech analysis unit 4 converts the speech signal input from the sound pickup unit 3 into a digital speech signal and performs noise suppression and speech detection on each frame using a known method. The speech analysis unit 4 calculates a speech feature quantity from the speech signal of an interval determined as including speech and outputs the speech feature quantity to the speech recognition unit 5. The speech analysis unit 4 outputs the speech signal of the interval determined as including speech to the attention determining unit 11.

(step S104) The speech recognition unit 5 generates speech information s using a known speech recognition method based on the speech feature quantity input from the speech analysis unit 4 and outputs the speech information to the utterance understanding unit 21 and the speech confidence degree calculating unit 221.

(step S105) The image analysis unit 7 converts the analog image signal input from the image-capturing 6 into a digital image signal. The image analysis unit 7 determines whether one or more objects exist based on the digital image signal and calculates an image feature quantity $o_f$ of the object. The image analysis unit 7 calculates the position information $o_p$ of the object and the trajectory-of-motion information $\xi$. The image analysis unit 7 outputs the image feature quantity $o_f$, the position information $o_p$, and the trajectory-of-motion information $\xi$ of each object to the utterance understanding unit 21.

(step S106) The utterance understanding unit 21 determines conceptual structure information z', action information a', and landmark information l' based on the speech information s input from the speech recognition unit 5 and the image feature quantity $o_f$ and the position information $o_p$ of the object o input from the image analysis unit 7.

The utterance understanding unit 21 outputs the conceptual structure information z' to the speech confidence degree calculating unit 221. The utterance understanding unit 21 outputs to the image confidence degree calculating unit 222 phrase information $w'_T$ representing a trajector and phrase information $w'_L$ representing a landmark, which are included in the conceptual structure information z', the trajectory information t', the landmark information l', the image feature quantity $o_{t',f}$ of the trajector, and the image feature quantity $o_{l',f}$ of the landmark. The utterance understanding unit 21 outputs to the motion confidence degree calculating unit 223 phrase information $w'_M$ representing a motion which is included in the conceptual structure information z', the action information a', the landmark information l', the position information $o_{t',p}$ of the trajector, and the position information $o_{l',p}$ of the landmark. The utterance understanding unit 21 outputs the action information a' and the position information $o_{t',p}$ of the trajector to the motion control unit 8. For example, similarly to the case where only one object is determined, when the landmark information l' is not determined, the utterance understanding unit 21 does not output the landmark information l', the image feature quantity $o_{l',f}$ of the landmark, and the position information $o_{l',p}$ of the landmark.

The detailed process of this step will be described later.

(step S107) The speech confidence degree calculating unit 221 of the command recognition unit 32 calculates conditional likelihood P(s|z';A) of the conceptual structure information z' with respect to the speech information s using phoneme acoustic model information A stored in the phoneme acoustic model storage unit 23 based on the conceptual structure information z' input from the utterance understanding unit 21 and the speech information s input from the speech recognition unit 5.

The speech confidence degree calculating unit 221 calculates the maximum value $\max_{y \in L(G_p)} P(s|z';A)$ of the conditional likelihood P(s|y;A) of the phoneme sequence y allowed by the phoneme network information $G_P$ stored in the phoneme network storage unit 24 with respect to the speech information s out of the likelihood with respect to the speech information s. The speech confidence degree calculating unit 221 calculates the degree of speech confidence $C_S$, for example, using Expression 1 based on this likelihood and a frame length n(s) as an analysis target of the speech information s and outputs the calculated degree of speech confidence to the command estimation value calculating unit 224.

(step 108) The image confidence degree calculating unit 222 reads the parameter set corresponding to the information of a phrase $w'_T$, which is input from the utterance understanding unit 21, representing a trajector from the command lexicon storage unit 25. The image confidence degree calculating unit 222 calculates the conditional likelihood $P(o_{t',f}|w'_T;L)$ of the phrase information $w'_T$ with respect to the image feature quantity $o_{t',f}$ by the use of the Gaussian function of Expression 2 using the parameter set read from the command lexicon storage unit 25 based on the image feature quantity $o_{t',f}$ of a trajectory input from the utterance understanding unit 21. The image confidence degree calculating unit 222 calculates the maximum value of the Gaussian function using this parameter set as the maximum value $\max_{o_f} P(o_f|w'_T;L)$ of the conditional likelihood with respect to the phrase information $w'_T$. The image confidence degree calculating unit 222 calculates the degree of image confidence $C_I$ by the use of Expression 3 using the conditional likelihood. The image confidence degree calculating unit 222 outputs the calculated degree of image confidence $C_I$ to the command estimation value calculating unit 224.

(step S109) The motion confidence degree calculating unit 223 reads the probability model information corresponding to the phrase information $w'_M$ representing a motion and the position information $o_{l',p}$ of a landmark, which are included in the conceptual structure information z' input from the utterance understanding unit 21, from the command lexicon storage unit 25. The motion confidence degree calculating unit 223 calculates the conditional likelihood $P(\xi'|o_{t',p},o_{l',p},w'_M;L))$ of the position information $o_{t',p}$ of a trajectory, the position information $o_{l',p}$ of a landmark, and the phrase information $w'_M$ with respect to the trajectory-of-motion information $\xi'$ input from the utterance understanding unit 21. The motion confidence degree calculating unit 223 calculates the maximum value $\max\xi_{,op} P(\xi'|o_p,o_{l',p},w'_M;L)$ of the conditional likelihood with respect to the input position information $o_{l',p}$ of the landmark and the phrase information $w'_M$ based on the probability model. The motion confidence degree calculating unit 223 calculates the degree of motion confidence $C_M$, for example, by the use of Expression 4 using the conditional likelihood. The motion confidence degree calculating unit 223 outputs the calculated degree of motion confidence $C_M$ to the command estimation value calculating unit 224.

(step S110) The command estimation value calculating unit 224 weights and adds the degree of speech confidence $C_S$ input form the speech confidence degree calculating unit 221, the degree of image confidence $C_I$ input from the image confidence degree calculating unit 222, and the degree of motion confidence $C_M$ input from the motion confidence degree calculating unit 223, and calculates the command estimation value using, for example, Expression 5 based on the weighted added value. The command estimation value calculating unit 224 outputs the calculated command estimation value to the motion control instructing unit 225.

(step S111) The motion control instructing unit 225 outputs the motion instructing signal to the motion control unit 8 and the command candidate selecting unit 216 of the utterance understanding unit 21, when the command estimation value input from the command estimation value calculating unit 224 is greater than a threshold value δ (N in step S111). The motion control instructing unit 225 ends the flow of processes when the command estimation value is equal to δ or smaller than δ (Y in step S111).

(step S112) The motion control unit 8 receives the action information a' the position information $o_{t',p}$ of the trajector, the landmark information l', and the position information $o_{l',p}$ of the landmark from the utterance understanding unit 21. The motion control unit 8 reads a power model corresponding to the action information a' from the driving power model storage unit 9 and determines the time-series data of power to be supplied to a component constituting at least a part of the motion mechanism unit 10, when the motion instructing signal is input from the motion control instructing unit 225. The motion control unit 8 supplies power to the component based on the determined time-series data of power. Accordingly, the motion mechanism unit 10 performs an operation corresponding to the user's speech information s recognized as a robot command and ends the flow of processes.

The detailed processes of step S106 will be described. FIG. 7 is a flow diagram illustrating the utterance understanding process of step S106.

(step S106-1) The speech belief calculating unit 211 calculates the conditional likelihood P(s|z;L) of the conceptual structure information candidate z with respect to the speech information s input from the speech recognition unit 5 based on the command lexicon information L read from the command lexicon storage unit 25. The speech belief calculating unit 211 reads the likelihood $P(z;G_r)$ corresponding to the conceptual structure information candidate z from the command lexicon storage unit 26. The speech belief calculating unit 211 calculates the speech belief function $B_S$, using, for example, Expression 7 based on the calculated conditional likelihood. The speech belief calculating unit 211 outputs the speech belief function $B_S$ to the command candidate selecting unit 216. The speech belief calculating unit 211 extracts the phrase information $w_T$ representing a trajector and the phrase information $w_L$ representing a landmark (when it is included in the conceptual structure information candidate z), which are included in the conceptual structure information candidate z, outputs the extracted phrase information $w_L$ to the image belief calculating unit 212, and outputs the phrase information $w_M$ representing a motion to the motion belief calculating unit 213 and the motion-object relationship belief calculating unit 214.

(step S106-2) The image belief calculating unit 212 reads a parameter set corresponding to the phrase information $W_T$ input from the speech belief calculating unit 211 from the command lexicon storage unit 25. The image belief calculating unit 212 calculates the conditional likelihood $P(o_{t,f}|w_T;L)$ of the phrase information $W_T$ with respect to the image feature quantity $o_{t,f}$, for example, using the Gaussian function of Expression 2 and using the parameter set read based on the image feature quantity $o_{t,f}$ of the trajector input from the image analysis unit 7. The image belief calculating unit 212 reads a parameter set corresponding to the phrase information $w_L$ representing a landmark input from the speech belief calculating unit 211 from the command lexicon storage unit 25. The image belief calculating unit 212 calculates the conditional likelihood $P(o_{l,f}|w_L;L)$ of the phrase information $w_L$ with respect to the image feature quantity $o_{l,f}$, for example, using the Gaussian function of Expression 2 and based on the read parameter set and the image feature quantity $o_{l,f}$ of the landmark input from the image analysis unit 7. The image belief calculating unit 212 calculates the image belief function $B_I$, for example, using Expression 8 based on the calculated conditional likelihood and the read command lexicon information, and outputs the calculated image belief function to the command candidate selecting unit 216. When the phrase information $w_L$ is not input, the part of log $P(o_{l,f}|w_L;L)$ in Expression 8 may not be calculated but may be set to zero.

(step S106-3) The motion belief calculating unit 213 reads the probability model information corresponding to the phrase information $w_M$ representing a motion input from the speech belief calculating unit 211 from the command lexicon storage unit 25. The motion belief calculating unit 213 calculates the conditional likelihood $P(\xi|o_p,o_{l,p},w_M;L)$, that is, the motion belief function $B_M$, of the position information $o_p$ of an object input from the image analysis unit 7, the position information $o_{l,p}$ of the landmark, and the phrase information $w_M$ with respect to the trajectory-of-motion information candidate ξ input from the image analysis unit 7 based on the read probability model information. The motion belief calculating unit 213 outputs the calculated motion belief function $B_M$ to the command candidate selecting unit 216.

(step S106-4) The motion-object relationship belief calculating unit 214 reads a parameter set R corresponding to the phrase information $w_M$ representing a motion, which is input from the speech belief calculating unit 211, from the first parameter set storage unit 27. The motion-object relationship belief calculating unit 214 calculates the conditional likelihood $P(o_{t,f},o_{l,f}|w_M;R)$, that is, the motion-object relationship belief function $B_R$, of the phrase information $w_M$ with respect to the image feature quantity $o_{t,f}$ and the image feature quantity $o_{l,f}$ using, for example, the Gaussian function of Expression 2 based on the image feature quantity $o_{t,f}$ of the trajector and the image feature quantity $o_{l,f}$ of the landmark input from the image analysis unit 7 and the read parameter set R. The motion-object relationship belief calculating unit 214 outputs the calculated motion-object relationship belief function $B_R$ to the command candidate selecting unit 216.

(step S106-5) The behavioral context belief calculating unit 215 receives as the behavioral context information q the trajector information t' and the landmark information l' from the command candidate selecting unit 216 when it is previously determined that the speech is the RD speech. The behavioral context belief calculating unit 215 reads a parameter set $B_H(t,q;H)$ corresponding to the current trajector information candidate t and the behavioral context information q from the second parameter set storage unit 28. The behavioral context belief calculating unit 215 reads a parameter set $B_H(l,q;H)$ corresponding to the current landmark information candidate l and the behavioral context information q from the second parameter set storage unit 28. The behavioral context belief calculating unit 215 calculates the behavioral context belief function $B_H$, for example, using Expression 9 and outputs the calculated behavioral context belief function $B_H$ to the command candidate selecting unit 216.

(step S106-6) The command candidate selecting unit 216 weights and adds the speech belief function BS, the image belief function $B_I$, the motion belief function $B_M$, the motion-object relationship belief function $B_R$, and the behavioral context belief function $B_H$ input from the speech belief calculating unit 211, the image belief calculating unit 212, the motion belief calculating unit 213, the motion-object relationship belief calculating unit 214, and the behavioral context belief calculating unit 215, respectively, and calculates the shared belief function Ψ(s, a, O, q, L, Gr, R, H, Γ).

(step S106-7) The command candidate selecting unit 216 determines whether the calculated shared belief function Ψ is the maximum value, performs the process of step S106-8 when the shared belief function is not the maximum value (N in step S106-7), and performs the process of step S106-9 when the shared belief function Ψ is the maximum value (Y in step S106-7).

(step S106-8) The command candidate selecting unit 216 changes the target to other conceptual structure information z and landmark information l and then performs the process of step S106-1 again.

(step S106-9) The command candidate selecting unit 216 selects or determines the conceptual structure information z', the landmark information l', and the action information a' in which the shared belief function Ψ has a maximum value.

The command candidate selecting unit 216 outputs the conceptual structure information z' to the speech confidence degree calculating unit 221. The command candidate selecting unit 216 selects and outputs the phrase information $w'_T$ representing a trajector, the phrase information $w'_L$ representing a landmark, the image feature quantity $o_{t',f}$ of the trajector, and the image feature quantity $o_{l',f}$ of the landmark, which are included in the trajectory information t', the landmark information l', and the conceptual structure information z', to the image confidence degree calculating unit 222. The command candidate selecting unit 216 outputs the action information a', the landmark information l', the position information $o_{t',p}$ of the trajector, the position information $o_{l',p}$ of the landmark, and the phrase information $w'_M$ representing a motion to the motion confidence degree calculating unit 223.

The command candidate selecting unit 216 outputs the position information $o_{t',p}$ of the trajector, the position information $o_{l',p}$ of the landmark, the action information a', and the landmark information l' to the motion control unit 8. When the motion instructing signal is input from the motion control instructing unit 225 of the command recognition unit 32, the command candidate selecting unit 216 outputs the selected landmark information l' and the trajectory information t' included in the action information a' to the behavioral context belief calculating unit 215. Then, the process of step S 107 is performed.

When the phrase information $w'_L$ representing a landmark is not included in the conceptual structure information z', the command candidate selecting unit 216 may not output the landmark information l', the image feature quantity $o_{l',f}$, and the position information $o_{l',p}$.

Unlike the command recognition robot 31 according to the second embodiment, when the attention determining unit 11 is not provided like the command recognition robot 1 according to the first embodiment, the processes of steps S101 and S102 in the command recognition method may not be performed. At this time, the command recognition method starts its flow of processes from steps S103 and S105.

The phrase confidence degree calculating unit 22 includes one of the image confidence degree calculating unit 222 and the motion confidence degree calculating unit 223, and may not perform the process of the other when it does not include the other and may calculate, in step S110, the command estimation value $C_{MS}$ based on the degree of speech confidence $C_S$ and the degree of confidence acquired in the process of step performed by the one.

The performance verification result of the command recognition unit 2 according to the first embodiment using clean speech and noisy speech will be described with reference to FIGS. 8 and 9. The clean speech is 2560 speech samples including 160 speech samples (which includes 80 RD speech samples and 80 OOD speech samples)×16 people. These speech samples are recorded in an anechoic room and is called clean speech corpus.

The noisy speech corpus includes noisy speech samples prepared by mixing noise signals with the speech signals of the clean speech corpus. The number of words stored in the command lexicon storage unit 25 is 56. The number of nouns and adjectives is 40 and the number of verbs is 19. Here, the number of motions expressed by 19 verbs is 10. The recognition rate of phonemes recognized by the speech recognition unit 5 is 83% and 67% in case of the clean speech corpus and the noisy speech corpus, respectively.

The data samples used for the verification are combinations in which the speech samples included in the clean speech corpus and the noisy speech corpus are correlated with image samples. The image representing a scene including three objects and being shown in FIG. 7 is an example of the image sample. This example shows a motion of placing an "orange" on a box in the immediately previous trial. That is, the "orange" is a trajector, and the trajectory information t of the "orange" among the objects detected from the photographed image is a behavioral context q. Before the verification, data from 15 people are used in pre-learning. The data of the remaining one person is used for the verification by 16 times. In the pre-learning, an experimenter optimizes the set Θ of weighting coefficients of degrees of confidence and the set Γ of weighting coefficients of the belief functions. The average $\Theta' = \{\theta'_0, \theta_1', \theta_2', \theta_3'\}$ of the weighting coefficients of degrees of confidence acquired by the optimization includes $\theta'_0 = 5.9$, $\theta_1' = 0.00011$, $\theta_2' = 0.053$, and $\theta_3' = 0.74$. The weighting coefficients of belief functions $\Gamma = \{\gamma_1, \gamma_2, \gamma_3, \gamma_4, \gamma_5\}$ include $\gamma_1 = 1.00$, $\gamma_2 = 0.75$, $\gamma_3 = 1.03$, $\gamma_4 = 0.56$, and $\gamma_5 = 1.88$.

Figure 8:
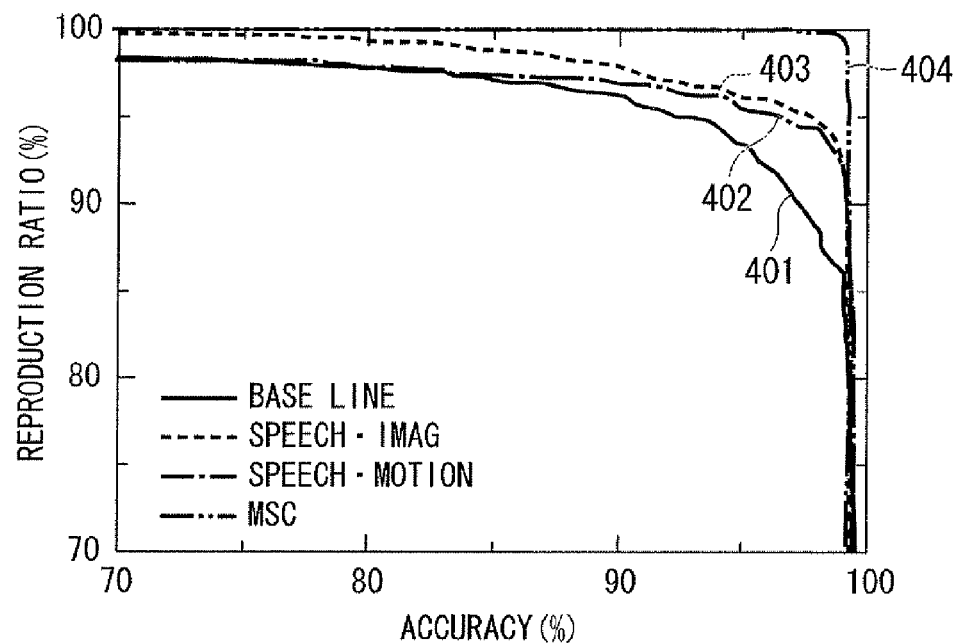
FIG. 8 is a diagram illustrating verification results in the case where a clean speech corpus is used in the command recognition device according to the first embodiment.

FIG. 8 is a diagram illustrating the verification result when the clean speech corpus is used in the command recognition unit 2 according to the first embodiment of the invention. FIG. 9 is a diagram illustrating the verification result when the noisy speech corpus is used in the command recognition unit 2 according to the first embodiment. In FIGS. 8 and 9, the horizontal axis represents accuracy and the vertical axis represents the reproduction ratio. The accuracy is a ratio of the number of verification times when a correct answer has been obtained with respect to the total number of verification times. That is, the accuracy is an indicator indicating the ratio of obtaining correct answers. The reproduction ratio is the ratio of the number of times when speech is determined as RD speech by the verification to the total number of times when the RD speech is used in the verification. That is, the reproduction ratio is an indicator indicating the comprehensibility of the RD speech. It is ideal that the accuracy is 100% and the reproduction ratio is 100%, but the accuracy and the reproduction ratio generally have a complementary relationship. That is, as the threshold value δ increases, the reproduction ratio decreases and the accuracy increases. As the threshold value δ used in the determination of the RD speech in the motion control instructing unit 225 decreases, the reproduction ratio increases but the accuracy decreases. Therefore, as the verification result comes closer to the upper-right corner of the drawings, it means that the performance improves.

Figure 9:
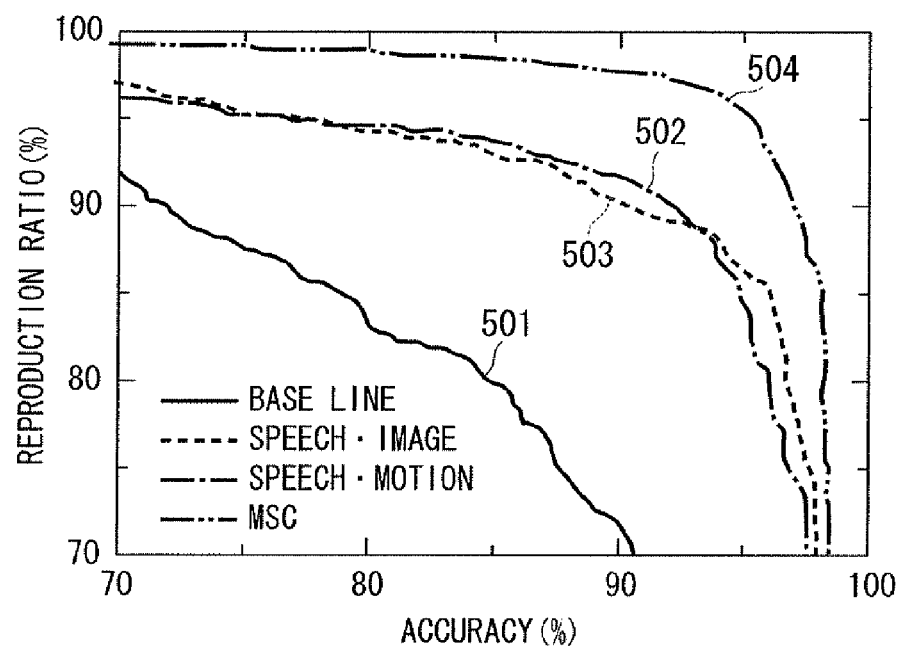
FIG. 9 is a diagram illustrating verification results in the case where a clean speech corpus is used in the command recognition device according to the first embodiment.

In FIGS. 8 and 9, solid lines 401 and 501 indicated by a "base line" show the result when the command estimation value has been calculated based on the degree of speech confidence. Dashed lines 403 and 503 indicated by "speech image" show the result when the command estimation value has been calculated based on the degree of speech confidence and the degree of image confidence. One-dot dashed lines 402 and 502 indicated by "speech-motion" show the result when the command estimation value has been calculated based on the degree of speech confidence and the degree of motion confidence. Two-dot dashed lines 404 and 504 indicated by "MSC" show the result when the command estimation value in the first embodiment has been calculated based on the degree of speech confidence, the degree of image confidence, and the degree of motion confidence.

Both FIGS. 8 and 9 show that the performance is improved by considering the degree of image confidence or the degree of motion confidence. Particularly, the "MSC" is the most excellent in performance in both the clean speech and the noisy speech. The "speech•motion" and the "speech•image" both have a performance better than "base line" performance in both the clean speech and the noisy speech. The average maximum F-value (F-measure) of the "MSC" and the "base line" are 99% and 94% in the clean speech, respectively, and are 95% and 83% in the noisy speech. That is, the F-value in the "MSC" is greater than that in the "base line" by 5% in the clean speech and by 14% in the noisy speech. Here, the F-value is calculated by the harmonic average of the accuracy and the reproduction ratio, that is, by 2×accuracy×reproduction ratio/(accuracy+reproduction ratio), and a high F-value means better performance. A statistical difference between the "MSC" and the "baseline" is confirmed in the clean speech and the noisy speech by the t-test (significant level $p<0.01$). Paying attention to the performance of 95% in the "MSC" and the performance of 83% in the "baseline" regarding the noisy speech, the "MSC" is particularly effective for the noisy speech. To determine the RD speech using the MSC in the motion control instructing unit 225, for example, the threshold value $\delta'$ maximizing the average F-value in the clean speech only has to be used. From the result, $\delta'=0.79$ can be set.

The verification result for the command recognition robot 31 according to the second embodiment will be described with reference to FIG. 10. In the test, it is assumed that two people are present in the front of the command recognition robot 31 and utter a robot command in Japanese to operate the command recognition robot 31. The experimenter calculates the weighting coefficient $\theta'$ and the threshold value $\delta'$ in advance and the command recognition robot 31 uses the obtained weighted coefficient $\theta'$ and the threshold value $\delta'$ in the test. The two people freely talk with each other in the test.

Here, four sessions of tests are performed by four groups of people. Each session lasts for 50 minutes. In the test environment, the motion mechanism unit 10 of the robot causes ambient noise. The people utter 850 pieces of speech during the test and the people manually determine whether each utterance is RD speech or OOD speech after the test.

Figures 10, 11:
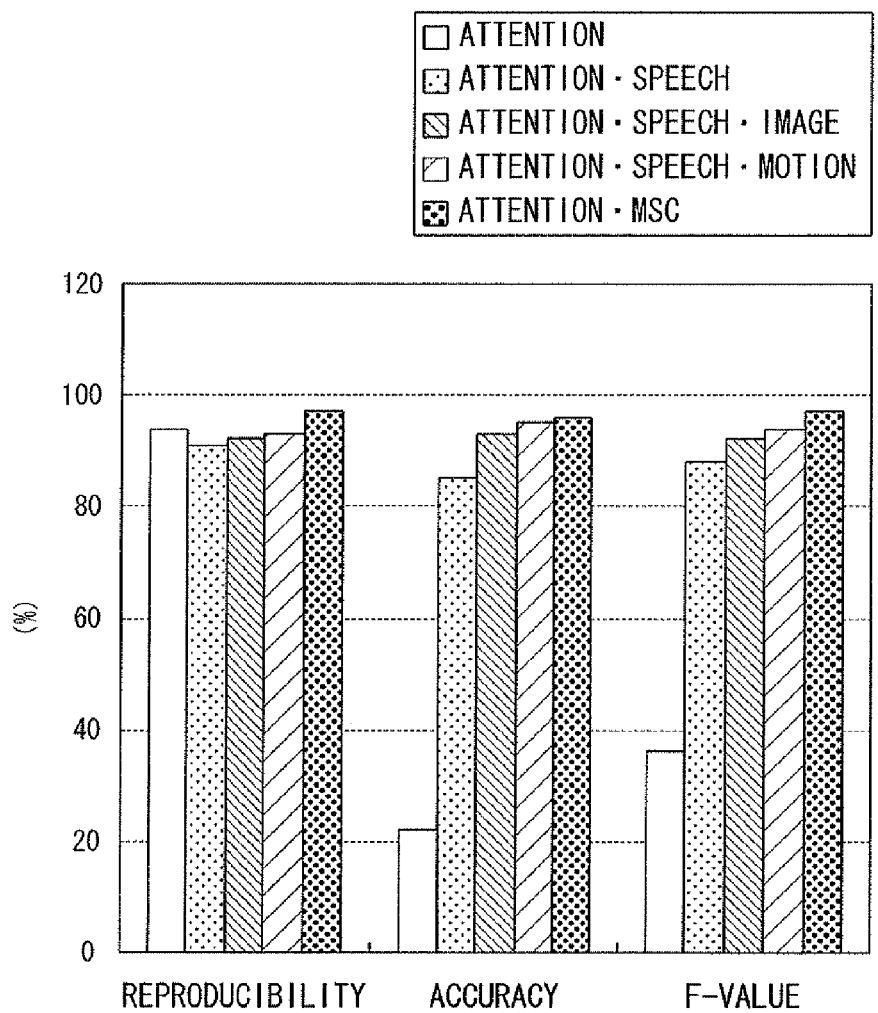
FIG. 10 is a diagram illustrating the numbers of samples of RD speech and OOD speech depending on attention or inattention to the command recognition device according to the second embodiment.
FIG. 11 is a diagram illustrating a reproduction ratio, accuracy, and an F-value in the command recognition robot according to the second embodiment.

FIG. 10 shows the number of RD speech samples and OOD speech samples depending on the attention or inattention to the command recognition robot 31 according to this embodiment. That is, FIG. 10 shows the result obtained by causing the attention determining unit 11 to detect the person's attention based on the person's facial orientation. The horizontal articles represent RD speech, OOD speech, and the total sum. The vertical articles represent attention to the command recognition robot 31, inattention to the command recognition robot 31, and the total sum. FIG. 10 shows (1) that almost all of the RD speech is made when the person sees the command recognition robot 31 and (2) that almost all of the OOD speech is made when the attention is given to the command recognition robot 31.

FIG. 11 shows the reproduction ratio, the accuracy, and the F-value of the command recognition robot 31 according to this embodiment based on the following conditions. (1) The "attention" means that only human attention is used. (2) The "attention•speech" means that the human attention and the degree of speech confidence are used. (3) The "attention•speech•image" means that the human attention, the degree of speech confidence, and the degree of image confidence are used. (4) The "attention•speech•motion" means that the human attention, the degree of speech confidence, and the degree of motion confidence are used. (5) The "attention•MSC" means that the human attention and the MSC are used.

FIG. 11 shows that the reproduction ratio is 96%, the accuracy is 22%, and the F-value is 36% regarding the "attention", but that the "attention•speech•image", the "attention•speech•motion", and the "attention•MSC" are greater in the reproduction ratio, the accuracy, and the F-value than the "attention•speech". That is, this result shows that the improvement of the performance is promoted by considering the degree of image confidence or the degree of motion confidence. The reproduction ratio in the "attention•MSC" is almost equal to that in the "attention", but the accuracy is 97% and the F-value is 97%, which are markedly improved.

The result shows that the detection of only the user's attention to the robot is not sufficient for detecting the RD speech of the robot, but the detection of the speech in addition to the attention as in this embodiment is effective for detecting the RD speech. In many cases, this is because human beings do not consider a robot to be an actual human being and utter speech only when they give attention to the robot.

In actual environments, ambient noise always exists to lower the reliability in speech recognition. However, as in this embodiment, it is possible to improve the performance for detecting the RD speech by using other information, that is, an image or a motion, in addition to the speech. Particularly, it is effective that the MSC based on the degree of speech confidence, the degree of image confidence, and the degree of motion confidence is used.

A part of the command recognition robot 1 or 31 or the command recognition unit 2 or 32 in the above-mentioned embodiments, such as the speech confidence degree calculating unit 221, the image confidence degree calculating unit 222, the motion confidence degree calculating unit 223, the command estimation value calculating unit 224, the motion control instructing unit 225, the utterance understanding unit 21, and the attention determining unit 11, may be embodied by a computer. In this case, the part may be embodied by recording a program for performing the control function in a computer-readable recording medium and causing a computer system to read and execute the program recorded in the recording medium. Here, the "computer system" is built in the command recognition unit or the command recognition robot and includes an OS or hardware such as peripherals. Examples of the "computer-readable recording medium" include memory devices of portable mediums such as a flexible disk, a magneto-optical disk, a ROM (Read Only Memory), and a CD-ROM, and a hard disk built in the computer system. The "computer-readable recording medium" may include a recording medium dynamically storing a program for a short time like a transmission medium when the program is transmitted via a network such as Internet or a communication line such as a phone line, and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

A part or all of the command recognition robot or the command recognition unit in the above-mentioned embodiments may be embodied as an integrated circuit such as an LSI (Large Scale Integration). The functional blocks of the command recognition robot and the command recognition unit may be individually formed into processors and a part or all thereof may be integrated as a processor. The integration technique is not limited to the LSI, but they may be embodied as a dedicated circuit or a general-purpose processor. When an integration technique taking the place of the LSI appears with the development of semiconductor techniques, an integrated circuit based on the integration technique may be employed.

While exemplary embodiments of the invention have been described in detail with reference to the accompanying drawings, it should be understood that the specific configurations are not limited to the above description and the invention may be modified in form and design without departing from the spirit or scope of the invention.

What is claimed is:

1. A command recognition device comprising:
    an utterance understanding unit that determines or selects word sequence information from speech information;
    speech confidence degree calculating unit that calculates degree of speech confidence based on the speech information and the word sequence information;
    a phrase confidence degree calculating unit that calculates a degree of phrase confidence based on image information and phrase information included in the word sequence information;
    an image analysis unit that calculates a trajectory-of-motion of an object from the image information, wherein the trajectory of motion is calculated based on time-series data of position coordinates of a trajectory in a motion of an object, where the position coordinates are variable in time; and
    a motion control instructing unit that determines whether a command of the word sequence information is to be executed based on a command estimation value which is calculated using the degree of speech confidence and the degree of phrase confidence,
    wherein the phrase confidence degree calculating unit calculates a degree of motion confidence representing the confidence that the trajectory-of-motion comprises a motion of the phrase information as the degree of phrase confidence.

2. The command recognition device according to claim 1, wherein the image analysis unit calculates a feature quantity of an object from the image information, and
    wherein the phrase confidence degree calculating unit calculates an degree of image confidence representing the confidence that the object having the feature quantity is an object of the phrase information as the degree of phrase confidence.

3. The command recognition device according to claim 2, wherein the motion control instructing unit determines whether the command of the word sequence information should be executed based on the command estimation value which is calculated using the degree of speech confidence, the degree of image confidence, and the degree of motion confidence.

4. The command recognition device according to claim 1, further comprising attention determining unit that determines whether speech uttering person gives attention to a robot based on a captured image and that executes the command of the word sequence information when determining that the speech uttering person gives attention to the robot.

5. The command recognition device according to claim 1, wherein the utterance understanding unit determines command information based on word sequence information of which a command is previously determined as being executed.

6. A command recognition method in a command recognition device, comprising:
    a first step of causing the command recognition device to determine or select word sequence information from speech information;
    a second step of causing the command recognition device to calculate degree of speech confidence based on the speech information and the word sequence information;
    a third step of causing the command recognition device to calculate a degree of phrase confidence based on image information and phrase information included in the word sequence information; and
    a fourth step of causing the command recognition device to determine whether a command of the word sequence information should be executed based on a command estimation value calculated using the degree of speech confidence and the degree of phrase confidence,
    wherein, in the third step, a trajectory-of-motion of an object is calculated from the image information, the trajectory of motion being calculated based on time-series data of position coordinates of a trajectory in a motion of an object, where the position coordinates are variable in time, and a degree of motion confidence representing the confidence that the trajectory-of-motion comprises a motion of the phrase information is calculated as the degree of phrase confidence.

7. A command recognition robot comprising:
    an utterance understanding unit that determines or selects word sequence information from speech information;
    speech confidence degree calculating unit that calculates degree of speech confidence based on the speech information and the word sequence information;
    a phrase confidence degree calculating unit that calculates a degree of phrase confidence based on image information and phrase information included in the word sequence information;
    an image analysis unit that calculates a trajectory-of-motion of an object from the image information, wherein the trajectory of motion is calculated based on time-series data of position coordinates of a trajectory in a motion of an object, where the position coordinates are variable in time;
    a motion control instructing unit that determines whether a command of the word sequence information should be executed based on a command estimation value which is calculated using the degree of speech confidence and the degree of phrase confidence; and
    a motion mechanism unit that executes the command based on the word sequence information,
    wherein the phrase confidence degree calculating unit calculates a degree of motion confidence representing the confidence that the trajectory-of-motion comprises a motion of the phrase information as the degree of phrase confidence.

* * * * *